United States Patent
Chiang et al.

(10) Patent No.: US 6,599,662 B1
(45) Date of Patent: Jul. 29, 2003

(54) ELECTROACTIVE MATERIAL FOR SECONDARY BATTERIES AND METHODS OF PREPARATION

(75) Inventors: Yet-Ming Chiang, Framingham, MA (US); Gerbrand Ceder, Wellesley, MA (US); Pimpa Limthongkul, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/479,154

(22) Filed: Jan. 7, 2000

Related U.S. Application Data

(60) Provisional application No. 60/115,299, filed on Jan. 8, 1999.

(51) Int. Cl.[7] .............................. H01M 4/58; H01M 4/62
(52) U.S. Cl. ............................... 429/218.1; 429/231.1; 429/231.9; 429/231.5; 429/217
(58) Field of Search ........................... 429/218.1, 231.1, 429/231.5, 231.9, 217

(56) References Cited

U.S. PATENT DOCUMENTS

| | | |
|---|---|---|
| 4,048,395 A | 9/1977 | Lai |
| 4,436,796 A | 3/1984 | Huggins et al. |
| 4,584,084 A | 4/1986 | Asano et al. |
| 4,950,566 A | 8/1990 | Huggins et al. |
| 5,603,983 A | 2/1997 | Clough et al. |
| 5,654,114 A | 8/1997 | Kubota et al. |
| 5,670,277 A | 9/1997 | Barker et al. |

OTHER PUBLICATIONS

Besenhard et al., "Dimensionally Stable Li–Alloy Electrodes for Secondary Batteries" *Solid State Ionics* 40/41:525–529 (1990) No Month.

Courtney et al., "Electrochemical and In Situ X–Ray Diffraction Studies of the Reaction of Lithium with Tin Oxide Composites" *J. Electrochem. Soc.*, 144:2045–2052 (Jun., 1997).

Courtney et al., "Key Factors Controlling the Reversibility of the Reaction of Lithium with $SnO_2$ and $Sn_2BPO_6$ Glass" *J. Electrochem. Soc.*, 144:2943–2948 (Sep., 1997).

(List continued on next page.)

*Primary Examiner*—Carol Chaney
*Assistant Examiner*—Tracy Dove
(74) *Attorney, Agent, or Firm*—Wolf, Greenfield & Sacks, P.C.

(57) ABSTRACT

This invention provides a composite material for use as an electrode in electrochemical devices. An electroactive composite material includes a first electroactive metal, the electroactive material including a phase enriched in a metal or metal alloy, $Me^I$, capable of intercalating or alloying with a species selected from the group consisting of alkali metals and hydrogen, and a second material having the first active material intimately mixed therein. The second material includes a metal oxide, $Me_y^{II}O_z$, wherein the metals $Me^I$ have a less negative Gibbs free energy for alloying or compound formation with oxygen than the metals that comprise $Me^{II}O$. The materials of the invention comprise a first material that is an elemental metal, metal alloy, metal oxide, or other metal compound, selected so that it is able to alloy with lithium, and prepared in a dispersed one-, two- or three-dimensional form. The first material is intimately mixed with or dispersed within a second material that may be substantially conductive to electrons or electron holes or lithium ions. The composite material may be prepared by a process known as "partial reduction" or "internal reduction," in which a precursor to the first material is preferentially reduced, or the process known as "partial oxidation," in which a precursor to the second material is preferentially oxidized.

52 Claims, 23 Drawing Sheets

OTHER PUBLICATIONS

Fauteux et al., "Rechargable Lithium Battery Anodes: Alternatives to Metallic Lithium" *Journal of Applied Electrochemistry* 23:1–10 (1993) No Month.

Idota et al., "Tin–Based Amorphous Oxide: A High–Capacity Lithium–Ion—Storage Material" *Science* 276:1395–1397 (1997) No Month.

Kepler et al., "Copper–tin Anodes for Rechargeable Lithium Batteries: An Example of the Matrix Effect in an Intermetallic System" *Journal of Power Sources* 81/82:383–387 (May, 1999).

Liu et al., "Studies of Stannic Oxide as an Anode Material for Lithium–Ion Batteries" *J. Electrochem. Soc.*, 145:59–62 (Jan., 1998).

Mao et al., "Active/Inactive Nanocomposites as Anodes for Li–Ion Batteries" *Electrochemical and Solid–State Letters*: 2:3–5 (Jan., 1999).

1cm = 20nm

ELECTROACTIVE MATERIAL FOR SECONDARY BATTERIES AND METHODS OF PREPARATION

This application claims priority under 35 U.S.C. §119(e) to U.S. Ser. No. 60/115,299 filed Jan. 8, 1999, and entitled "Anodes for Lithium Secondary Batteries and Methods of Preparation".

BACKGROUND OF THE INVENTION

Metals that form alloys or intermetallic compounds with lithium have been considered for use as alternatives to lithium metal or carbon electrodes in lithium electrochemical devices such as lithium ion batteries. Examples of such metals include Al, B, Bi, Cd, In, Ga, Pb, Sb, Si, Sn, Zn, or mixtures of these metals, as reviewed by R. A. Huggins (J. Power Sources, 26 109–120 (1989) and D. Fateaux and R. Koksbang (J. Appl. Electrochemistry, 23, p. 1 (1993)).

Even those metals that do alloy with lithium to high concentrations, for example reaching a lithium to metal molar ratio of at least one, have severe limitations as an electrode material, as discussed in the article by D. Fateaux and R. Koksbang. A major limitation is the fact that the formation of a highly lithiated alloy or compound from a metal is accompanied by a large volume expansion. The volume expansion of the alloy or compound relative to the molar volume of the starting metal increases greatly with lithium concentration, such that the compositions that are most desirable due to having the highest lithium storage have the largest expansion. Amongst numerous metals that can alloy with lithium to a high concentration, the lithiated alloy can easily expand to a molar volume that is 1.5 to 5 times that of the starting metal. It is widely recognized by those skilled in the art that this volume expansion, and the subsequent volume contraction which occurs when lithium is electrochemically removed, is undesirable as it often causes mechanical fracture of the metal electrode, resulting in decreased lithium storage capability. The lithium-concentration-dependent volume change is particularly detrimental in electrochemical devices that undergo cycling, in which lithium is repeatedly removed from and inserted into the metal electrode. A rechargeable lithium battery is one such device.

Y. Idota, T. Kubota, A. Matsufuji, Y. Maekawa, T. Miyasaka, (Science, 276 1395 (1997)), and T. Kubota and M. Tanaka (U.S. Pat. No. 5,654,114) have described lithium battery anodes based on metal oxides, primarily tin oxide, that are capable of reversible charge capacity of approximately 600 mAh/g (2200 mAh/cm$^3$). The primary drawback of this type of material has been the high first-cycle irreversible capacity loss, typically 400–600 mAh/g, due to the consumption of lithium in oxide-forming reactions during the first lithium insertion. These anodes are prepared as an oxide, not as a metal or a metal-oxide composite, and do not demonstrate the advantageous features which result from the processes of partial oxidation or reduction as described herein below prior to being assembled as a battery.

O Mao et al., (Electrochem. Sol. St. Lett., 2[2]3–5 (1999)) have described Sn/Fe/C composites of several nanometer individual phase particle size produced by mechanical alloying. The composites demonstrate a lower first-cycle irreversible capacity loss and also lower reversible capacity on a weight and volume basis (200 mAh/g, 1700 mAh/cm$^3$) than the tin oxides. These electrode materials have an inactive phase of high density, detracting from their capacity, and rely upon fine size alone for their improved properties relative to bulk metals. They do not utilize the beneficial methods of partial reduction or oxidation in their preparation.

Thus, the electroactive metal oxides and metals of the prior art do not provide a mechanically robust material having the desired reversible charge capacity for use in cyclically operated electrochemical devices. New materials and methods of their manufacture are needed.

SUMMARY OF THE INVENTION

One objective of the invention is to provide an electroactive material having a robust microstructure that can accommodate the large volume changes associated with electrochemical insertion or removal of lithium.

Another object of the invention is to provide an electrode and other electrochemical devices such as rechargeable batteries which contain a mechanically robust electroactive material and which are resistant to mechanical failure of the electrode.

It is also an object of the invention to provide an electroactive material having a high reversible charge capacity for us in cyclically operated electrochemical devices such as a rechargeable battery.

Still another object of the invention is to provide a method of making an electroactive material which is sufficiently mechanically robust to withstand the internal stresses experienced during the large volume changes which occur during electrochemical insertion or removal of lithium.

These and other objectives are realized in the materials and methods of preparation comprising the invention, as is substantially described herein.

In one aspect of the invention, a composite material is provided having a first material that is an elemental metal, metal alloy, metal oxide, or other metal compound, selected so that it is able to alloy with lithium or other element such as hydrogen, potassium, sodium and the like, and prepared in a dispersed one-, two- or three-dimensional form. The first material is intimately mixed with or dispersed within a second material that provides mechanical support for the first material and, optionally, is substantially conductive to electrons or electron holes or lithium ions. The composite material may possess void spaces, or it may experience internal stress. Either feature may be advantageous in increasing the reversible charge capacity of the material.

By the term "dispersed," it is understood that the smallest dimension of the metal or metal compound that is less than 10 micrometers, preferably less than 5 micrometers, and more preferably still less than 1 micrometer. The dispersed material is substantially surrounded by the supportive second material.

By the term "electroactive," it is understood to mean that during operation of the device the metal, alloy, or compound stores electrical charge by forming an alloy with lithium or other element such as hydrogen, potassium, sodium and the like.

In a preferred embodiment of the invention, the composite material includes a first material that is an elemental metal or metal alloy, selected so that it is able to alloy with lithium or other element such as potassium, sodium and the like, and prepared in a dispersed one-, two- or three-dimensional form. The first material is intimately mixed with or dispersed within a metal oxide that provides mechanical support for the first material and, optionally, is substantially conductive to electrons or electron holes or lithium ions. The metal oxide may be glassy or crystalline. Crystalline metal oxide systems are currently preferred since they simplify the selection process, their ionic and electronic transport properties being generally known. However, glassy oxides can have equally advantageous transport properties. In preferred embodiments, the crystalline metal oxide is a normal spinel, inverse spinel, or disordered spinel structure compound $Me''_c X_d$ where $0.5<c/d<1$, or a rutile structure compound $Me''_x O_y$ where $0.5<x/y<1$ or an ordered or disordered derivative of this structure type, or a corundum or ilmenite structure compound $Me''_x O_y$ where $0.5<x/y<1$ or an ordered or disordered derivative of this structure type, or a perovskite structure compound $Me''_x O_y$ where $0.5<x/y<1$ or an ordered or disordered derivative of this structure type.

In other preferred embodiments, the crystal structure is selected to promote ion, e.g., lithium ion, transport and electronic conductance.

In preferred embodiments, the composite may be prepared by the process hereafter referred to as "partial reduction," "preferential reduction," or "internal reduction," or the process hereafter known as "partial oxidation." These methods of preparation confer numerous benefits as described herein. Partial reduction or oxidation refers to processes in which only a portion of the material is reduced or oxidized, respectively. By internal reduction, the term is understood to mean a process in which the reduction product, i.e., a metal, forms as a discrete phase within or internal to the starting material phase, which may be a single crystalline or multicrystalline material. By partial reduction, the term is understood to include internal reduction, but also to include processes in which the reduction product, i.e., a metal, nucleates or forms as a discrete phase or precipitate at surfaces, such as the surface of a powder particle. Both processing methods are observed to provide the materials and advantages of the invention.

In one aspect of the invention, a composite material for use as an energy-storage material is provided which includes a first material comprising one or more metals, metal alloys or metal compounds containing $Me^I$ capable of alloying with a species selected from the group consisting of alkali metals and hydrogen, the first material intimately mixed with a matrix of a second material comprising a metal compound $Me''X$, produced by partial reduction of a mixed-metal composition $Me^I_a Me''_{1-a} X_z$, where $0.1<a<0.9$, $z>0$, and X is one of oxygen, boron, carbon, nitrogen, phosphorus, fluorine, chlorine, bromine, or iodine, under conditions that preferentially reduce $Me^I$ over $Me''$.

In another aspect of the invention, a composite material for use as an energy-storage material includes a first material comprising one or more metals, metal alloys or metal compounds containing $Me^I$ capable of alloying with a species selected from the group consisting of alkali metals and hydrogen, the first material intimately mixed with a matrix of a second material comprising a metal compound $Me''X$, produced by partial oxidation of a mixed-metal composition $Me^I_a Me''_{1-a} X_z$, where $0.1<a<0.9$, $z>0$, and X is one of oxygen, boron, carbon, nitrogen, phosphorus, fluorine, chlorine, bromine, or iodine, or a starting mixed-metal alloy $Me^I_a Me''_{1-a}$, where $0.1<a<0.9$ under conditions that preferentially oxidize $Me''$ over $Me^I$.

A composite material is prepared by subjecting a starting mixed-metal compound to a chemical or thermochemical treatment to convert a component thereof into a first material, which is "lithium-active" wherein the term is understood to mean that it alloys with lithium during operation of the electrochemical device. The thermochemical treatment causes the volume occupied by the first material to decrease relative to the volume it formerly occupied (as the precursor component) and relative to a second material, which is also a component of the mixed-metal compound and non-reactive, or only partially reactive, under the conditions of the thermochemical treatment. The second material provides a rigid mechanical frame work, and/or provides electronic conductivity, and/or provides lithium ion conductivity to the first material. The second material can also store lithium although it is not required to do so.

Taking for example a metal compound that decreases its molar volume upon being reduced, according to the invention an electroactive material is prepared by chemical or thermochemically preferentially reducing certain components of a starting mixed-metal compound in order to produce a first material of decreased molar volume, or by preferentially oxidizing certain components of the starting mixed-metal compound to produce a second material of increased molar volume (both relative to the volume initially occupied by the respective precursor metal compound in the mixed-metal starting material.) Some metal compounds expand in volume upon reduction, in which case the choice of reduction or oxidation is selected so as to achieve the desired volume change depending on whether the metal comprises the first material or second material. Herein, molar volume is understood to be the volume of an amount of the metal, metal alloy, or metal compound containing one mole of metal atoms. In the instance of a metal alloy or mixed-metal compound, the mole of metal atoms is understood to contain each of metals in the same proportion as is present in the alloy or compound.

In another aspect of the invention, electrodes are provided. The composite material may be used as an electrode in lithium ion electrochemical devices such as lithium batteries and electrochromic windows, mirrors, or displays, or electrochemical devices that use the material as an electrode or storage material.

Thus, one embodiment of the invention includes using a starting mixed-metal composition $Me^I_a Me''_{1-a} X_z$, where $0.1<a<0.9$, $z>0$, and X is one of oxygen, boron, carbon, nitrogen, phosphorus, fluorine, chlorine, bromine, or iodine to obtain an electroactive composite material. The starting composition may be a single-phase material, i.e. a solid solution, or a mixed-phase material, i.e., a microphase separated material or a combination of individual phases as is discussed hereinbelow. It is chemically or thermodynamically, partially or internally reduced so as to produce a fine metal dispersion enriched in $Me^I$, i.e., the first material, intimately mixed with or contained within a metal compound more enriched in $Me''$ and X than the first material, i.e., the second material. The term reduction is understood to mean a decrease in the value of z, or a decrease in the oxidation state of any one of the metals. The metals $Me^I$ include one or more metals that have a less negative Gibbs free energy for the formation of an alloy or compound with an element X than the metals that comprise $Me''$ do with X. Alternatively stated, the metals $Me^I$ are preferentially reduced relative to the $Me''$ metals. The second material may also subsequently alloy with lithium, although according to the invention it is not necessary that it do so.

In preferred embodiments, X is oxygen and $Me^I$ is one or more of Ag, Sb, Sn, Cu, In, Ge, Zn, Ga, B, and Si, and preferably is Ag, Sb, Zn or Sn. In other preferred embodiments, $Me''$ is one or more of Cu, Mn, Sb, Ni, Co, Fe, In, Ge, Zn, Ga, Cr, V, B, Si, Ti, Ta, Nb, Ru, Ce, Al or Mg, and preferably is V, Ti, Mn, Ni, Co or Fe. $Me''$ is further selected to have a more negative. Gibbs free energy of metal oxide formation than $Me^I$. When the starting compound is a mixed-metal oxide, the metal or metals having the least negative Gibbs free energy of formation amongst the metal oxides comprising the starting mixed-metal oxide will be preferentially reduced to the zero-valent state to form the dispersed metal phase or phases of the composite material of the invention. The oxide comprising the second material is preferably a transition metal oxide, or a mixed-metal oxide in which the metal fraction is at least 10% by mole a transition metal, preferably at least 25%, 50%, 75% or at least 90% molar composition. After the partial reduction process, the material is useful as a lithium-active component of an electrode in a lithium electrochemical device.

In a preferred embodiment, the mixed-metal compound comprises $Me_x^I Mn_{3-x}XO_{4-y}$ spinel, x being between about 0.5 and 2 and y being between zero and about 0.5, and the metal $Me^I$ after reduction is Ag, Sb, Zn, or Sn, and manganese alloys thereof.

In another preferred embodiment, the starting mixed-metal composition has formula $Me_b^I Me_{2-b}^{II} O_e$, $Me^I$ is Ag, where $Me^{II}$ is Mn, and $0.9<b<2.1$, and $3.8<e<4.2$.

In still another preferred embodiment, the starting mixed metal composition has formula $Me_b^I Me_{2-b}^{II} O_e$, where $Me^I$ is Sb, $Me^{II}$ is Mn, and $1.8<b<2.2$, and $3.8<e<4.2$.

In yet another embodiment, the starting mixed metal composition has formula $Me_b^I Me_{II2-b} O_e$, $Me^I$ is Zn, where $Me^{II}$ is Mn, and $0.9<b<2.1$, and $3.8<e<4.2$.

In another preferred embodiment, the starting mixed-metal composition has the formula $Me_b^I Me_{1-b}^{II} O_e$, where $Me^I$ is Sb, $Me^{II}$ is V, and $0.5<b<1.5$, and $3.8<e<4.6$.

In another preferred embodiment, the starting mixed-metal composition has the formula $Me_b^I Me_{1-b}^{II} O_e$, where $Me^I$ is Sn, $Me^{II}$ is Ti, and $0.2<b<0.8$, and $1.8<e<2.2$.

Another aspect of the invention includes using a starting mixed metal alloy $Me_a^I Me_{1-a}^{II}$, or a starting mixed metal compound $Me_a^I Me_{1-a}^{II} X_z$, where $0.1<a<0.9$, $z>0$, and X is one of oxygen, boron, carbon, nitrogen, phosphorus, fluorine, chlorine, bromine, or iodine to obtain an electroactive composite material. The starting composition may be a single-phase material, i.e. a solid solution, or a mixed-phase material, i.e., a microphase separated material or a combination of individual phases as is discussed hereinbelow. It is chemically or thermodynamically, partially or internally oxidized so as to produce an oxidized metal compound enriched in $Me^{II}$ within which is a fine metal dispersion enriched in $Me^I$. The term oxidation is understood to mean an increase in the value of z, or an increase in the oxidation state of any one of the metals. The metals $Me^I$ are understood to be one or more metals that have a less negative Gibbs free energy for the formation of an alloy or compound with an element X than do the metals that comprise $Me^{II}$.

When the starting compound is a mixed metal oxide, the metal or metals that have the least negative Gibbs free energy of formation amongst those metal oxides comprising the starting mixed metal oxide form the dispersed metal phase or phases. After the partial oxidation process, the material is useful as a lithium-active component of an electrode in a lithium electrochemical device.

Still another embodiment of the invention uses any of the above methods and materials to prepare a material in which the lithium-active first material and the second material are both oxides, but in which the oxide of the first material is more reduced causing it to have decreased its absolute volume relative to the oxide of the second material. Such a composite material may be considered to be a multiphase oxide rather than a metal-oxide composite. However, it is novel compared to all previously known oxide anodes used in lithium batteries, including the oxides described by Idota et al. and T. Kubota and M. Tanaka, in being a multiphase oxide prepared with a partially reduced lithium-active oxide phase of decreased molar volume, that is subsequently able to alloy with a greater amount of lithium. The composite is characterized by being in a state of internal tension and compression. due to the volume changes experienced during thermochemical treatment.

Yet another aspect of the invention comprises materials in which a starting mixed-metal compound $Me_a^I Me_{1-a}^{II} X_z$, where $Me^I$, $Me^{II}$, X, a, and z are as defined above, is mixed with or encompassed within a second material that is a metal or metal alloy, and is then subjected to internal reduction such that said starting compound is reduced, while the second material being initially metallic is not substantially further reduced. In this material the mixed metal compound undergoes volumetric reduction within a matrix or host of the second material which undergoes substantially less volume change.

In each of the above embodiments where a first material and a second material are described, it is understood that each are separate and distinguishable phases, wherein the term "phase" is understood to mean a form of condensed matter distinguishable in structure or composition from another. The first and second materials can each also be a mixture of distinguishable phases. After the chemical or thermochemical treatment prescribed the material is useful as a lithium-active component of an electrode in a lithium electrochemical device. In particular, it is useful as the lithium-active anode material in a rechargeable battery using as the cathode a lithium intercalation compound, for example those based on $LiCoO_2$, $LiNiO_2$ or $LiMn_2O_4$.

Yet another embodiment of the invention comprises a mixed metal compound $Me_a^I Me_{1-a}^{II} X_z$, where $Me^I$, $Me^{II}$, X, a, and z are as defined above, which has been partially reduced so that the value of z is decreased, but without forming a separate metal phase enriched in $Me^I$. The material resulting after partial reduction is a single phase of matter $Me_a^I Me_{1-a}^{II} X_z$ that is more reduced than the starting compound, that is, it has a lower value of z, or the average oxidation state of the metals is lower. The partially reduced material is then able to alloy with lithium to a higher concentration than it can without the partial reduction treatment.

In each of the above embodiments of the invention, the thermochemical treatment prescribed preferably also results in a lithium-active first material and a substantially less active second material that are together in a state of internal stress which is subsequently partly or completely relieved as lithium is inserted into the electrode. For instance, partial reduction causing a decrease in molar volume of the first material can result in a particle of the first material that is in a state of hydrostatic tension, in which case the volume expansion of the metal upon lithiation partly or totally relieves the tensile stress. Another such a stress state is one that is not hydrostatic but has at least one tensile component, in the tensor representation of stress that is well known to those skilled in the art. Another example is a stress state that is predominantly in shear, but in which the strain energy due to shear can nonetheless be reduced by alloying of the metal with lithium. The state of internal stress in the materials of the invention can also be so great as to cause the formation of internal voids, in which case the stress is partly relieved. In this instance, the presence of internal voids also permits a greater amount of lithium to be alloyed with the material than is possible in the absence of the prescribed chemical or thermochemical treatments.

Internal stress and/or internal void space increases the capacity of the material for lithium insertion. For example, compressive and tensile stresses brought about by a volume decrease in the formation of the lithium active first material may be relieved by electrochemical alloying of lithium with the first material since such a process results in a volume increase. Furthermore, void spaces, made in order to accommodate stresses developing in the material, provide additional volume within the composite material which accommodates volume increases from electrochemical alloying of the first material with lithium.

A bulk metal used as an electrode in a conventional lithium ion battery or other such electrochemical system can sometimes be alloyed to higher lithium concentrations than those of known intermetallic compounds in published phase diagrams, some of which are shown in Table 1 (found herein below). This is done by the application of a sufficiently high electrical driving force to insert or alloy lithium into the metal above and beyond that which gives the intermetallic compound in question. The resulting alloy may accept excess lithium to a point, beyond which metallic lithium precipitates and the voltage difference between the alloy and a lithium reference electrode in an electrochemical cell would be zero. For a bulk metal electrode, this kind of material is not substantially different from having a lithium metal electrode, since lithium metal is present as a distinct phase in the metal electrode. The limitations of lithium metal electrodes, such as poor safety upon exposure to water, are present in such a material, as are the limitations associated with volume expansion of the alloy.

In contrast, in the materials of the invention, overlithiation of the metal to compositions richer in lithium than those shown in published phase diagrams is possible without suffering these negative consequences. This is possible, firstly, because the first material that is alloyed with lithium is substantially protected from exposure to a reactive environment by being partially or completely surrounded by a less reactive second material, and secondly, because the lithium-active first material is prepared in a state of decreased molar volume prior to assembly into an electrochemical device. The materials of the invention are therefore distinguished from previous lithium electrodes made of the same metals, but not under conditions of practical reduction or oxidation, in having better retention of charge capacity upon electrochemical cycling over the same voltage range relative to lithium metal. In particular, the materials of the invention have a high weight or volumetric charge capacity over a voltage range relative to lithium metal as the counter electrode that is less than 2 volts. They are further distinguished by having a high weight or volumetric charge capacity over many charging and discharging cycles. These results are unexpected to those skilled in the art.

The materials of the invention are readily produced in the form of a film or sheet by deposition processes such as sputtering and evaporation, using one or more targets or sources, or by chemical vapor deposition using gas phase reactants, or by electrochemical deposition, or by slurry-based processes such as spin-casting, dip-coating, and tape-casting, or by mechanical deformation processes such as rolling, swaging, and extrusion. Thus the invention also comprises the materials of the invention prepared in the form of a thin film or a sheet, and devices made from or containing such forms of the materials.

BRIEF DESCRIPTION OF THE DRAWINGS

The invention is described with references to the following figures which are presented for the purpose of illustration and are not limiting of the invention and in which.

DETAILED DESCRIPTION OF THE INVENTION

Metal-Oxide Composites Produced by Partial Reduction

Figure 1A:
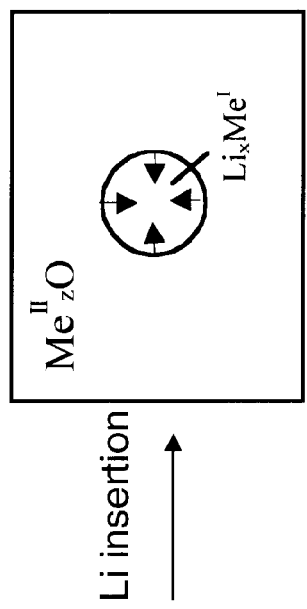
FIG. 1 is a schematic diagram illustrating the principle of one embodiment of the invention wherein internal reduction of a metal oxide $Me^I_yO$ to the metal $Me^I$ is accompanied by a volume shrinkage that allows subsequent lithiation to $Li_xMe^I$ with a smaller net volume change.
Figure 1B:
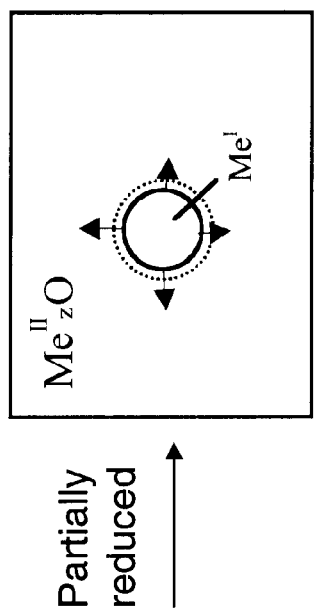
Figure 1C:
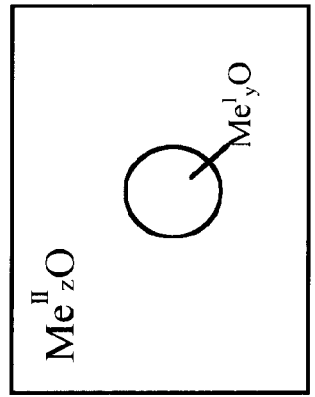

FIG. 1 illustrates the process of internal reduction used to form the metal-metal oxide composites of the invention, in which a mixed metal oxide starting material is reduced to form a metal particle, followed by lithiation to form a lithium alloy or intermetallic compound. With reference to FIG. 1A, metal oxide $Me^I_y O$ has a less negative Gibbs free energy of formation than metal oxide $Me^{II}_x O$. Therefore, the $Me^I O + O = Me^I O$ phase stability line lies above that for $Me^{II} O + O = Me^{II} O$ on the Ellingham diagram, so that conditions exist for which $Me^{II}$ is preferentially in the oxidized state and $Me^I$ I preferentially in the reduced state. The mixed-metal oxide starting material may be subjected to a partial reduction under conditions which reduce the metal oxide $Me^I_y O$ to the metal $Me^I$, while leaving $Me^{II}_x O$ substantially unaffected. Typically, metal oxides have a higher molar volume than metals, so that reduction of a metal oxide to a metal is accompanied by volume shrinkage, as is shown in FIG. 1B. Subsequent lithiation (FIG. 1C) of $Me^I$ to $Li_x Me^I$ is accompanied by a volume expansion, however, due to the volume shrinkage associated with formation of the $Me^I$ phase in the $Me^{II}_x O$ phase, a smaller net volume change is observed. Thus, partial reduction provides a composite capable of alloying with lithium without being subjected to the mechanical stresses experienced by conventionally prepared composites. Clearly, the smallest positive net volume change possible or even a negative net volume change, while using materials having high theoretical charge capacity, is desired.

For a mixed-metal oxide $Me^I_a Me^{II}_{1-a} O_z$ containing at least two metals, the more noble metal or metals (those having the least negative Gibbs free energy of formation) are preferentially selected to be those that will be predominantly alloyed with lithium during subsequent use of the material as an electrode. The starting mixed-oxide can be a single phase material, or it can be microphase separated. The metal oxide with the least negative Gibbs free energy of formation is then preferentially reduced to its metal through heat treatment in a gas atmosphere where the oxides of this metal or metals are unstable relative to the metal. The conditions of reduction also are chosen so as to prevent complete reduction of the remaining metal oxide(s) to their metal(s). These metal oxides remain intimately mixed with the dispersed metal alloy phase, or form a host or matrix within which the reduced metals are contained as a fine dispersion. Upon doing so, a metal-metal oxide composite is formed which enjoys several advantageous features.

Fine dispersion of the metal. Partial reduction may be conducted at a temperature where the mobility of the metals is relatively low; and therefore, a highly dispersed morphology results. The metal can form as a fine dispersion of particles, rods or plates, as a thin continuous phase at grain boundaries, a continuous network at three-grain junctions, or some mixture of these. This metal dispersion is prevented from subsequent coarsening during electrochemical cycling by the surrounding oxide matrix, which is a rigid solid and through which atom transport (except lithium) is slow at temperatures of electrochemical cycling. By "fine dispersion" it is understood that the metal phase particles regardless of shape have a smallest dimension that is less than 10 micrometers, preferably less than 5 micrometers, and more preferably less than 1 micrometer, and still more preferably less than 0.1 micrometers; however, unlike the materials of Mao et al., it is not necessary for the metal phase particles to have an individual particle size smaller than about 200 nanometers in order to realize the benefits of the invention.

Volume shrinkage upon reduction. Virtually all metal oxides have a greater molar volume than their metals. Therefore the metal dispersion formed by internal reduction is under internal tensile stress hydrostatically, or is in a non-hydrostatic stress state with at least one directional component of the stress being tensile. The tensile stress is in some instances partially or totally relieved by the formation of internal voids or cavities, or by volume changes in the host or matrix. In any one of these conditions, the subsequent volume expansion upon lithiation is better accommodated than in a metal anode that is not initially under tensile stress nor is adjacent to void space.

Differential thermal contraction. The tensile stress is further magnified by the fact that many metal alloys have larger coefficients of thermal expansion than oxides. In a metal-metal oxide composite in which the metal forms a dispersed phase, cooling from a higher temperature where internal stresses are substantially relaxed to a lower ambient temperature at which the electrochemical device is to be used is accompanied by greater thermal contraction of the metal or metal alloy relative to the oxide. The greater thermal contraction of the metal results in a further increase in the tensile component of stress placed upon the metal, or in a greater volume of internal voids. Thus this invention also comprises the selection of a metal alloy and matrix material such that the metal alloy has the greater thermal expansion coefficient.

Electronically and tonically conductive matrix. Attractive mixed-metal oxides for internal reduction processing include those with an easily reduced metal oxide combined with a less noble transition metal oxide. Under the chemical or thermochemical treatments necessary for internal reduction, such an oxide remaining as the matrix can be chosen to be electronically conductive. They can also be chosen so as to have a high lithium ion conductivity (e.g., rocksalt, spinel, or rutile structure type oxides). The properties of the metal oxide matrix formed in compatibility with the metal dispersion are an important consideration, and are part of the selection criteria for the materials of the invention.

Safety. It is well-known that fine metal powders can be highly reactive, oxidizing readily upon exposure to oxidizing ambient, sometimes in a pyrophoric manner. By encompassing the fine metal dispersion within an oxide host or matrix, the reactivity of the metal is reduced and its safety is improved. The reactivity of the electrode material with other components of a lithium electrochemical device, such as the liquid electrolyte in a lithium battery, is also decreased by partially or completely isolating the metal from the electrolyte as is accomplished in the materials of the invention.

Table 1 lists a number of metals that can be considered for use as an electroactive material in lithium electrodes. Their selection is based on the currently accepted principle in the art of alloying the metal with lithium or forming lithium intermetallic compounds. The weight and volumetric charge capacities corresponding to particular lithiated compositions are given. It is noted that there are two schemes for representing such capacities. If the electrode is prepared in one of the lithiated compositions shown, when it is used as the negative electrode (anode) in a lithium battery the first cycle is generally a discharge cycle, in which lithium leaves the anode and enters the cathode. For such batteries the weight and volumetric capacity of the anode is based on the formula weight and density of the lithiated compound, as is represented in the article by D. Fateaux and R. Koksbang. The second representation is based on a battery in which the lithium is initially contained in the cathode, for example in an intercalation compound $LiCoO_2$, and the anode is initially substantially free of lithium. The first cycle is then a charging cycle in which lithium is inserted into the anode. In this instance, it is appropriate to base the weight and volumetric capacity of the anode on the starting formula weight and density of the starting unlithiated anode material. This scheme is used by Y. Idota et al. and O Mao et al. The results in Table 1 are computed according to this latter scheme, except for lithium metal, for which the weight and volumetric capacities would be infinitely large.

In Table 1, the volume change that occurs when oxides are first reduced to their metals and then lithiated to a known intermetallic composition are given for a number of pure metals. The ratios of molar volumes for the starting oxide and the final lithiated compound are also listed in Table 1. It is recognized that certain reactions have particularly low net volume changes, which may be preferred when selecting an electroactive material. For instance, the reaction $Sb_2O_5 \rightarrow 2Sb$ (metal) $\rightarrow 2Li_3Sb$ has zero net volume change for the solid metal compound, and the reaction $6GeO_2 \rightarrow 6Ge$ (metal) $\rightarrow Li_{11}Ge_6$ has only a 16% volume expansion. Both of these systems have quite high theoretical capacity values for the metal as well, based solely on the alloys that are known to form at thermal equilibrium, and not including the more lithium-enriched alloys that can be formed with the benefit of the present invention.

TABLE 1

| Oxide | MW (g/mole) | Density (g/cm3) | Molar Volume (cm3/mole of metal) | Metal | MW (g/mole) | Density (g/cm3) | Molar Volume (cm3/mole of metal) | Lithiated Cmpnd | MW (g/mole) |
|---|---|---|---|---|---|---|---|---|---|
| | | | | Li | | | | Li | 6.941 |
| Al2O3 | 101.96 | 3.965 | 12.86 | Al | 26.98 | 2.7 | 9.99 | LiAl | 33.92 |
| | | | | | | | | Li9Al4 | 170.4 |
| | | | | | | | | Li3Al | 74.79 |
| Ag2O | 231.74 | 7.14 | 16.23 | Ag | 107.87 | 10.5 | 10.27 | LiAg | 114.81 |
| AgO | 123.87 | 7.44 | 16.65 | | | | | Li10Ag3 | 393.01 |
| B2O3 | 69.62 | 1.812 (glass) | 19.21 | B | 10.81 | 2.34 | 4.62 | Li5B4 | 77.95 |
| | | | | | | | | Li7B6 | 113.45 |
| Bi2O3 | 465.96 | 8.9 | 26.18 | Bi | 208.98 | 9.8 | 21.32 | Li3Bi | 229.8 |
| | | | | | | | | LiBi | 215.92 |
| CdO | 128.41 | 6.95 | 18.48 | Cd | 112.41 | 8.65 | 13 | LiCd | 119.35 |
| | | | | | | | | Li3Cd | |
| CuO | 79.55 | 6.4 | 12.43 | Cu | 63.55 | 8.96 | 7.09 | Li0.25Cu | 65.29 |
| Cu2O | 143.1 | 6 | 11.93 | Cu | 63.55 | 8.96 | 7.09 | Li0.25Cu | 65.29 |
| Ga2O3 | 187.44 | 6.44 | 14.55 | Ga | 69.72 | 5.91 | 11.8 | Li5Ga4 | 313.59 |
| | | | | | | | | Li2Ga | 83.6 |
| | | | | | | | | Li3Ga2 | 160.26 |
| | | | | | | | | LiGa | 76.66 |
| GeO2 | 104.59 | 6.239 (tet) | 16.76 | Ge | 72.59 | 5.35 | 13.57 | Li11Ge6 | 511.89 |
| GeO2 | 104.59 | 4.228 (hex) | 24.74 | | | | | Li11Ge6 | 511.89 |
| GeO2 | 104.59 | 6.239 (tet) | 16.76 | | | | | Li7Ge2 | 193.77 |
| GeO2 | 104.59 | 4.228 (hex) | 24.74 | | | | | Li7Ge2 | 193.77 |
| GeO2 | 104.59 | 6.239 (tet) | 16.76 | | | | | Li22Ge5 | 515.65 |
| GeO2 | 104.59 | 4.228 (hex) | 24.74 | | | | | Li22Ge5 | 515.65 |
| In2O3 | 277.64 | 7.179 | 19.34 | In | 114.82 | 7.3 | 15.73 | Li3In2 | 250.46 |
| | | | | | | | | Li3In3 | 434.69 |
| | | | | | | | | Li2In | 128.7 |
| | | | | | | | | LiIn | 121.76 |

TABLE 1-continued

| | | | | | | | | | |
|---|---|---|---|---|---|---|---|---|---|
| PbO | 223.2 | 9.53 | 23.42 | Pb | 207.2 | 11.34 | 18.27 | Li22Pb5 | 1188.7 |
| | | | | | | | | LiPb | 214.14 |
| | | | | | | | | Li8Pb3 | 677.13 |
| | | | | | | | | Li7Pb2 | 462.99 |
| | | | | | | | | Li3Pb | 228.02 |
| | | | | | | | | Li10Pb3 | 691.01 |
| Sb2O3 | 291.5 | 5.2 | 28.03 | Sb | 121.75 | 6.684 | 18.22 | Li2Sb | 135.63 |
| Sb2O5 | 323.5 | 3.8 | 42.57 | | | | | Li2Sb | 135.63 |
| Sb2O3 | 291.5 | 5.2 | 28.03 | | | | | Li3Sb | 142.57 |
| Sb2O5 | 323.5 | 3.8 | 42.57 | | | | | Li3Sb | 142.57 |
| Sb2O3 | 291.5 | 5.2 | 28.03 | | | | | Li3Sb | 142.57 |
| Sb2O5 | 323.5 | 3.8 | 42.57 | | | | | Li3Sb | 142.57 |
| SiO2 | 60.08 | 2.64 | 22.76 | Si | 28.09 | 2.33 | 12.06 | Li12Si7 | 279.89 |
| | | | | | | | | Li21Si8 | 370.45 |
| | | | | | | | | Li13Si4 | 202.58 |
| | | | | | | | | Li21Si5 | 286.19 |
| SeO2 | 110.96 | 3.95 | 28.09 | Se | 78.96 | 4.79 | 16.48 | Li2Se | 92.84 |
| SnO2 | 150.69 | 6.95 | 21.68 | Sn | 118.69 | 7.31 | 16.24 | Li5Sn2 | 272.09 |
| | | | | | | | | Li13Sn5 | 683.68 |
| | | | | | | | | Li7Sn2 | 285.97 |
| | | | | | | | | Li22Sn5 | 746.15 |
| ZnO | 81.38 | 5.61 | 14.51 | Zn | 65.39 | 7.13 | 9.17 | LiZn | 72.32 |
| | | | | C (graphite) | 12.011 | 2.25 | 5.34 | LiC6 | 13.17 |

| Oxide | Density (g/cm3) | Molar Volume (cm3/mole of metal) | Average Voltage (against Li) | Theor. Weight Capacity (Ah/kg of starting metal) | Theor. Volume Capacity (mAh/cm3 of starting metal) | Metal to Oxide Molar Volume Ratio | Lithiated Cmpnd to Metal Molar Volume Ratio | Lithiated Cmpnd to Oxide Molar Volume Ratio |
|---|---|---|---|---|---|---|---|---|
| | 0.53 | 13.1 | 0 | 3860 | 2047 | | | |
| Al2O3 | 1.741 | 19.48 | 0.36 | 993.5 | 2683 | 0.777 | 1.95 | 1.51 |
| | 1.269 | 33.57 | ?? | 2235.5 | 6035.7 | 0.777 | 3.36 | 2.61 |
| | 1.484 | 50.4 | ?? | 2980.6 | 8047.6 | 0.777 | 5.05 | 3.92 |
| Ag2O | 5.962 | 19.26 | ?? | 248.5 | 2609.2 | 0.633 | 1.88 | 1.19 |
| AgO | 2.658 | 49.29 | ?? | 828.3 | 8697.5 | 0.633 | 4.8 | 3.04 |
| B2O3 | 1.075 | 18.13 | 0.02 | 3099.6 | 7253.1 | 0.24 | 3.92 | 0.94 |
| | ?? | | 0.02 | 2893 | ?? | 0.24 | ?? | ?? |
| Bi2O3 | 5.025 | 45.73 | 0.81 | 384.8 | 3771 | 0.81 | 2.15 | 1.75 |
| | 7.43 | 29.06 | 0.83 | 128.3 | 1257 | 0.81 | 1.36 | 1.11 |
| CdO | 5.269 | 22.65 | 0.25 | 238.5 | 2062.7 | 0.7 | 1.74 | 1.23 |
| | ?? | ?? | 0.02 | 715.5 | ?? | 0.7 | 2.68 | ?? |
| CuO | 8.96 | 7.29 | ?? | 105.5 | 944.8 | 0.57 | 1.03 | 0.59 |
| Cu2O | 8.96 | 7.29 | ?? | 105.5 | 944.8 | 0.59 | 1.03 | 0.61 |
| Ga2O3 | 3.804 | 20.61 | ?? | 480.6 | 2840.3 | 0.81 | 1.75 | 1.42 |
| | 2.923 | 28.6 | ?? | 769 | 4544.5 | 0.81 | 2.42 | 1.97 |
| | 3.479 | 23.03 | ?? | 576.7 | 3408.4 | 0.81 | 1.95 | 1.58 |
| | 4.259 | 18 | ?? | 384.5 | 2272.2 | 0.81 | 1.53 | 1.24 |
| GeO2 | 2.973 | 28.7 | ?? | 677 | 3622 | 0.81 | 2.12 | 1.71 |
| GeO2 | 2.973 | 28.7 | ?? | 677 | 3622 | 0.55 | 2.12 | 1.16 |
| GeO2 | 2.277 | 42.55 | ?? | 1345.7 | 7199.3 | 0.81 | 3.14 | 2.54 |
| GeO2 | 2.277 | 42.55 | ?? | 1345.7 | 7199.3 | 0.55 | 3.14 | 1.72 |
| GeO2 | 2.042 | 50.5 | ?? | 1691.7 | 9050.5 | 0.81 | 3.72 | 3.01 |
| GeO2 | 2.042 | 50.5 | ?? | 1691.7 | 9050.5 | 0.55 | 3.72 | 2.04 |
| In2O3 | 4.336 | 28.88 | ?? | 350.2 | 2556.4 | 0.81 | 1.84 | 1.49 |
| | 2.318 | 62.51 | ?? | 233.5 | 1704.2 | 0.81 | 3.97 | 3.23 |
| | 3.784 | 34.01 | ?? | 466.9 | 3408.5 | 0.81 | 2.16 | 1.76 |
| | 5.146 | 23.66 | ?? | 233.5 | 1704.2 | 0.81 | 1.5 | 1.22 |
| PbO | 3.948 | 60.22 | 0.292 | 569.2 | 6455.1 | 0.78 | 3.3 | 2.57 |
| | 8.004 | 26.75 | 0.45 | 129.4 | 1467.1 | 0.78 | 1.46 | 1.14 |
| | 5.369 | 42.04 | 0.45 | 345 | 3912.2 | 0.78 | 2.3 | 1.8 |
| | 4.579 | 50.56 | 0.292 | 452.8 | 5134.7 | 0.78 | 2.77 | 2.16 |
| | 5.065 | 45.02 | 0.374 | 388.1 | 4401.2 | 0.78 | 2.46 | 1.92 |
| | 4.479 | 51.43 | 0.292 | 431.2 | 4890.2 | 0.78 | 2.82 | 2.2 |
| Sb2O3 | 3.786 | 35.82 | 0.95 | 440.3 | 2943.2 | 0.65 | 1.97 | 1.28 |
| Sb2O5 | 3.786 | 35.82 | 0.95 | 440.3 | 2943.2 | 0.43 | 1.97 | 0.84 |
| Sb2O3 | 3.336 | 42.74 | 0.95 | 660.5 | 4414.8 | 0.65 | 2.35 | 1.53 |
| Sb2O5 | 3.336 | 42.74 | 0.95 | 660.5 | 4414.8 | 0.43 | 2.35 | 1 |
| Sb2O3 | 2.963 | 48.17 | 0.95 | 660.5 | 4414.8 | 0.65 | 2.64 | 1.72 |
| Sb2O5 | 2.963 | 48.17 | 0.95 | 660.5 | 4414.8 | 0.43 | 2.64 | 1.13 |
| SiO2 | 1.526 | 26.2 | ?? | 1635.9 | 3811.6 | 0.53 | 2.17 | 1.15 |
| | ?? | ?? | 0.158 | 2505 | 5836.6 | 0.53 | ?? | ?? |
| | 1.25 | 40.52 | 0.158 | 3101.4 | 7226.2 | 0.53 | 3.36 | 1.78 |
| | 1.197 | 47.82 | 0.2 | 4008 | 9338.5 | 0.53 | 3.97 | 2.1 |
| SeO2 | 2.852 | 32.55 | ?? | 679 | 3252.2 | 0.59 | 1.96 | 1.16 |
| SnO2 | 3.513 | 38.73 | 0.485 | 564.6 | 4127.3 | 0.75 | 2.39 | 1.79 |
| | 3.466 | 39.45 | 0.485 | 587.2 | 4292.4 | 0.75 | 2.43 | 1.82 |
| | 2.957 | 48.35 | 0.385 | 790.5 | 5778.2 | 0.75 | 2.98 | 2.23 |
| | 2.562 | 58.25 | 0.385 | 993.7 | 7264.1 | 0.75 | 3.59 | 2.67 |

TABLE 1-continued

| ZnO | 3.964 | 18.24 | 0.005 | 409.9 | 2992.8 | 0.63 | 1.99 | 1.26 |
|-----|-------|-------|-------|-------|--------|------|------|------|
|     | ??    | ??    | 0.5   | 372   | 836.9  |      |      |      |

Any of the metals listed in Table 1 can, in principal, be the active metal in a metal-metal oxide composite produced according to the present invention. However, it is recognized that some are more desirable than others. The selection criteria for choosing particularly useful metals $Me^I$ include the following considerations.

Metals of lower mass and lower molar volume are more desirable since they have higher weight and volumetric charge capacity when alloyed with a given lithium molar concentration.

The voltage at which lithium alloys with the metals $Me^I$ must be suitably low, preferably less than 2 volts and more preferably less than 1 volt, when measured against a bulk lithium metal electrode, for applications where the metal-metal oxide composite is used as the negative electrode (anode) in a lithium battery.

The metal oxide must be easily reducible to its metal, as judged by its Gibbs free energy of formation. The metal oxide or oxides that are to be reduced to metal or metal alloy must have a less negative Gibbs free energy of formation than the oxides that are to remain as the oxide comprising the second material.

Metals with a lower net volume change as shown in Table 1 are desirable.

The melting point of the metal undergoing reduction must not be too low, otherwise coarsening during processing and use is likely to occur. It is preferred, although not required, that the metal oxide undergoing reduction can be reduced at a temperature below the melting point of the metal that is produced.

The formation of a solid solution with a transition metal oxide or the existence of phase equilibria allowing microphase separation is desirable, although not essential.

Raw materials cost should be low.

Toxicity of the metals and oxides comprising the material must be acceptable.

In consideration of the above criteria, mixed oxide solid solutions crystallizing in a wide variety of structure types, including but not limited to, rocksalt, spine, rutile, corundum, ilmenite, and perovskite structures are useful as starting oxides for internal reduction processing. The oxide crystal structure type may be, but need not be, the same before and after internal reduction. Transition metal oxides of the rocksalt, spinel, corundum and rutile structure types and ordered or disordered derivatives thereof are, in part, attractive because they can be good electronic and lithium-ion conductors and as such are useful host or matrix materials for internally-reduced metal dispersions.

Suitable transition metal oxides for use as the second or host material are those including first row transition metals, such as Ti, V, Cr, Mn, Fe, Co, Ni, Cu, Nb, or metals such as Mo, Ru or Ce. Mixed-metal oxides containing a significant molar proportion of transition metal are also within the scope of the invention. In preferred embodiments, the mixed-metal oxide to be used as the second material includes at least 10%, at least 25%, at least 50%, at least 75% or at least 90% by mole of one or more of the metals Ti, V, Cr, Mn, Fe, Co, Ni, Cu, Nb, Mo, Ru or Ce.

Non-limiting examples of suitable transition metal oxides include the manganese spinels. Solid solutions between $Mn_3O_4$ and the metal oxides of Ag, Sb, Sn, and Zn are known. Table 2 lists several $Me_xMn_yO_4$ oxides in which Me is one of the anode metals from Table 1 and also has a less negative Gibbs free energy of oxidation than does manganese. For each of the mixed-metal spinels of Table 2, preferential reduction of the metal Me is possible at temperatures less than 1000° C. using readily available $CO/CO_2$ mixtures.

TABLE 2

Manganese Mixed-Oxides and Spinels for Internal Reduction

| Metal (Me) | Max. number of Li per metal | $Me_xMn_yO_4$ spinels | Theoretical Weight Capacity (mAh/g)* |
|------------|------------------------------|------------------------|---------------------------------------|
| Ag         | 12                           | $AgMn_2O_4$            | 881                                   |
|            |                              | $Ag_2MnO_4$            | 1284                                  |
| Sb         | 3                            | $Sb_2MnO_4$            | 427                                   |
| Sn         | 4.4                          | $SnMn_2O_4$            | 365                                   |
| Zn         | 1                            | $ZnMn_2O_4$            | 109                                   |
|            |                              | $Zn_2MnO_4$            | 203                                   |

*For the composite, assuming the oxide to be inactive in the voltage range of metal lithiation.

In preferred embodiments, the mixed metal oxide starting materials are selected to provide a metal oxide as the second material having high electronic conductivity or high ionic, e.g., lithium ion, conductivity, or both. The second material remaining after partial reduction or partial oxidation may include a compound between $Me^{II}$ and element X that has an electronic conductivity of greater than $10^{-9}$ S/cm at 20° C., or a lithium ion conductivity of greater than $10^{-9}$ S/cm at 20° C., or both. In preferred embodiments, ionic and/or electronic conductivity is greater than $10^{-8}$ S/cm at 20° C., and more preferably greater than $10^{-6}$ S/cm at 20° C.

Using the above selection criteria and examples, preferred combinations of $Me^I$ and $Me^{II}$ may be identified.

In preferred embodiments in which X is oxygen, $Me^I$ is Ag, and $Me^{II}$ is one or more of Cu, Mn, Sb, Sn, Ni, Co, Fe, In, Ge, Zn, Ga, Cr, V, B, Si, Ti, Ta, Nb, Ru, Ce, Al, or Mg; or $Me^I$ is Sb, and $Me^{II}$ is one or more of Sn, Ni, Co, Fe, In, Ge, Zn, Ga, Cr, V, B, Si, Ti, Ta, Nb, Ru, Ce, Al, or Mg; or $Me^I$ is Sn, and $Me^{II}$ is one or more of Ni, Co, Fe, In, Ge, Zn, Ga, Cr, V, B, Si, Ti, Ta, Nb, Ru, Ce, Al, or Mg; or $Me^I$ is In, and $Me^{II}$ is one or more of Zn, Ga, Cr, V, B, Si, Ti, Ta, Nb, Ru, Ce, Al, or Mg; or $Me^I$ is Ge, and $Me^{II}$ is one or more of Zn, Ga, Cr, V, B, Si, Ti, Ta, Nb, Ru, Ce, Al, or Mg; or $Me^I$ is Zn, and $Me^{II}$ is one or more of Ga, Cr, V, B, Si, Ti, Ta, Nb, Ru, Ce, Al, or Mg; or $Me^I$ is Ga, and $Me^{II}$ is one or more of Cr, V, B, Si, Ti, Ta, Nb, Ru, Ce, Al, or Mg; or $Me^I$ is B, and $Me^{II}$ is one or more of Si, Ti, Ta, Nb, Ru, Ce, Al, or Mg; or $Me^I$ is Si, and $Me^{II}$ is one or more of Ti, Ta, Nb, Ru, Ce, Al, or Mg.

In preferred embodiments, $Me^I$ is Sb and $Me^{II}$ is V, Ta or Nb. In other preferred embodiments, $Me^I$ is Bi and $Me^{II}$ is Ta or V.

From the foregoing description, the development of similarly detailed examples of each of the above embodiments will be apparent to those skilled in the art. For instance, to extend the examples to starting compounds $Me^I_aMe^{II}_{1-a}X_z$ where X is not oxygen, it is understood that chemical or thermochemical reduction is conducted by exposing the compound to an environment with a reduced activity of X relative to that in the starting compound, and thermochemical oxidation is conducted by exposing the compound to an environment with a higher activity of X. For example, a mixed-metal sulfide can be partially reduced by heating in an environment of lower sulfur activity, and a mixed-metal nitride can be partially reduced by heating in an environment of lower nitrogen activity.

Metal-Metal Oxide Composites Prepared by Microphase-Separation and Preferential Reduction Another embodiment of the invention utilizes phase separation on a microscopic scale in order to partition the metal oxides prior to the preferential reduction step. This process and the resulting materials, have particular advantages in that the oxide that is not reduced acts as a physical barrier to confine the metal phase, assisting in the formation and retention of a fine metal dispersion. According to the invention, microphase separation can be achieved through numerous methods, including precipitation from solid solution, spinodal decomposition, eutectic solidification, and eutectoid decomposition. In a particularly preferred embodiment, the oxides are selected for their ability to form a complete solid solution at a higher temperature, and to exhibit immiscibility at a lower temperature. Upon becoming immiscible, the oxide phase or phases that are subsequently reduced to metal may be a substantially pure oxide of the resulting metal, or may be a mixed-metal oxide as described earlier. While each of these processes of phase separation may be known for many materials, the use of such microphase separated oxides in the preparation of electrode materials for use in lithium ion batteries or other such electrochemical devices has not been previously reported. The present invention realizes for the first time that phase-separated metal oxides may be used as starting materials to obtain metal-metal oxide composites, and that the composites may be employed advantageously as electrodes in electrochemical devices.

Phase separation is best accomplished in systems having a high degree of immiscibility between the material phases and in systems for which the phases are well-separated on the Ellingham diagrams. A particularly preferred system for preparing phase-separated mixed metal compounds is the $TiO_2$—$SnO_2$ system. The $TiO_2$—$SnO_2$ system is particularly well-suited to this embodiment of the present invention for several reasons. Its binary phase diagram exhibits a miscibility gap. Compositions within the miscibility gap undergo microphase separation into finely-divided phases that are rich in $SnO_2$ and $TiO_2$ respectively. In addition, $SnO_2$ and $TiO_2$ are well-separated on the Ellingham diagram, with $SnO_2$ having a less negative Gibbs free energy of formation and therefore being reducible to its metal under temperature and oxygen activity conditions where $TiO_2$ is not. Both Sn metal and $TiO_2$ are furthermore known to be a good Li intercalation hosts. The size scale of the $SnO_2$ and $TiO_2$ rich phases can be as fine as ~5 nm, which permits the formation of finely dispersed metal phases. The rate at which the oxide solid solution undergoes microphase separation is highly variable through the manipulation of temperature-time cycles, firing atmosphere, and composition. These rates can be rapid and suitable for manufacturing.

In a previous work by H. Maruyama, Y.-M. Chiang, M. Kawamoto, Y. Seki, S. Arakawa, K. Kikuta, and S. Hirano ("Spinodal Decomposition in Bulk and Thin Film (Ti,Sn) O2," in *Ceramic Transactions* Vol. 24, edited by T. O. Mason and J. L. Routbort, The American Ceramic Society, Westerville, Ohio, 1991), it was shown that $TiO_2$—$SnO_2$ solid solutions undergo decomposition into $TiO_2$ and $SnO_2$ rich phases at rates that could be varied from nearly instantaneous (i.e., the samples could not be quenched without phase separation) to hundreds of hours, depending on the temperature and the dopant. When doping with subvalent cations such as $Sb^{3+}$, $In^{3+}$ or $Al^{3+}$ (hereafter referred to as acceptor dopants), the rate of decomposition can be so fast as to be virtually unquenchable when a bulk sample is cooled from a temperature above the miscibility cap (e.g., from 1500(C.). Firing in a reducing gas atmosphere will have the same effect as subvalent doping. Reduction also raises the electronic conductivity of any remaining oxide, which is advantageous for electrode applications. Furthermore, by doping with supervalent cation such as $Nb^{5+}$ or $Ta^{5+}$ (hereafter referred to as donor dopants), the rate of decomposition into the two phases can also be fast, on the order of a few hours at 873° C. These dopants raise the electronic conductivity of the oxide, which is advantageous in electrode applications. Phase separation into very fine regions of $SnO_2$— and $TiO_2$-rich composition, 10 nm or less in width, is possible using these dopants and appropriate heat treatments.

In a preferred metal oxide system, the metals $Me^I$ and $Me^{II}$ include Sn and Ti, respectively, such that the ratio of molar concentrations Sn/Ti is from 0.25 to 4 and the sum of molar concentrations Sn+Ti (when compared with all metals in the system) is greater than 0.8. In other embodiments, a small amount of other metals $Me^{III}$ may be added to help promote phase separation and/or to improve the electrical conductivity of the resulting material. Generally, a third metal $Me^{III}$ may be added at a molar concentration from 0.002 to 0.1 that of the combined molar concentration (Sn+Ti), $Me^{III}$ being selected from the group Al, Ta, In, Sb, Nb, V, Cr, Mn, Fe, Ni, or W, singly or together, such that the number $N=|\Sigma(n\times[Me^{III}])-4|\times\Sigma[Me^{III}]$, where n is the oxidation state of each $Me^{III}$ and $[Me^{III}]$ is its molar concentration and the summations are over all metals $Me^{III}$, has a value N>0.001. In particular, the metals $Me^I$ and $Me^{II}$ may include Sn and Ti, respectively, such that the ratio of molar concentrations Sn/Ti is from 0.25 to 4 and the sum of molar concentrations Sn+Ti is from 0.95 to 0.998, the balance being Al, or Ta.

It is recognized, however, that phase separation from a solid solution is not essential in order to obtain a mixture of oxide phases, one or more of which are subsequently preferentially reduced relative to the others. Segregated metal oxide materials may be prepared using other conventional methods. For example, particles of the oxide that is to be reduced may be coated with a second material prior to reduction. This second material comprises metals or metal oxides that intercalate less lithium than the metals that are formed by internal reduction.

In yet another example, a finely divided mixed powder may be used. The starting material may be prepared as a fine powder of average particle diameter less than 30 micrometers, preferably less than 15 micrometers, preferably less than 10 micrometers, preferably less than 5 micrometers, preferably less than 2 micrometers and preferably less than 1 micrometer. The mixed powder may be obtained by mixing fine particles of the oxide which is to be reduced with particles of the second material. Suitable fine particles may be obtained by chemical precipitation of multiple phases or by the mixing of fine powders of the different materials. The mixed powders may then be subject to partial reduction. Prior to partial reduction, the mixed powders may be consolidated into aggregates of the phases by firing at an elevated temperature or by pressure-densification using cold-pressing, hot-pressing, rolling, extrusion, or other methods of consolidation well-known to those skilled in the art.

In the embodiments of the invention that utilize internal reduction or partial reduction, it is understood that the lithium-active first material can contain lesser concentrations of the metals of the second material, and vice versa, since there can be incomplete compositional separation during partial reduction or partial oxidation, or substantial solid solubility of the metals of the second material in the first material, and vice versa, due to the internal stresses produced by the thermochemical treatment. Moreover, it is recognized that where a metal phase is produced by internal or partial reduction, it can have an increased solubility of oxygen compared to the same phase present as a bulk material, due to the inherent tensile stresses produced in the metal upon partial reduction or partial oxidation.

Several additional materials and processing methods are provided below which comprise several additional embodiments of this aspect of the invention.

Mechanically-Worked Oxides: One embodiment of the invention comprises the use of a mechanically-worked mixed oxides as the material which is partially reduced. Plastic deformation of solids produces crystallographic point, line, and extended defects, as well as permanent mechanical strain, that raise the Gibbs free energy of the worked oxide relative to that of an unworked or annealed oxide. This makes more negative the Gibbs free energy for the formation of any particular metal from the starting oxide, as well as increasing the kinetics of reduction. Methods for mechanically working the oxide in order to accomplish this objective include attritor-milling, Spex-milling, high energy ball milling, and other methods well-known to those skilled in the art for the milling of materials. Brittle solids such as glassy or crystalline metal oxides are more easily milled into fine particles as they tend to fracture rather than plastically deforming as metals do. Furthermore, the process of reduction reduces further the molar volume of the oxide and therefore the particle size. Thus, the partial reduction of a mechanically milled mixed-metal oxide is advantageous for the production of electroactive ultrafine metal particles dispersed amongst a second material.

Ultrafine Oxide Dispersions: In another embodiment of the invention the starting oxide is prepared in the form of a very fine dispersion. A solid in the form of very fine particles has an increased Gibbs free energy, relative to that of the same metal present in a coarse state, due to surface energetics and forces, as is known by the Gibbs-Thomson-Freundlich effect in thermodynamics. According to the invention, an ultrafine oxide dispersion preferentially reduces to its metal due to its increased Gibbs free energy even when it has not been mechanically worked nor is under any externally applied stress except for that due to its own surface or its interface with a surrounding medium. Such oxide dispersions may be one-, two-, or three-dimensional in their shape. That is, they may be fine equiaxed particles, fine rods or networks of rods, or thin sheets of the oxide. The smallest dimension of the dispersed metal particle, rod, or sheet is less than 0.5 micrometer, preferably less than 0.1 micrometer, and even more preferably less than 0.025 micrometers in order to have a substantial increase in free energy relative to the bulk oxide.

Other Electrochemical and Energy Storage Materials

The invention is not limited to electrode materials that alloy with lithium only. It is recognized that the materials of the invention also comprise useful electrodes for electrochemical systems that utilize hydrogen, other alkali metal such as Na and K, or other atoms or molecules as the species that is transported in order to achieve energy storage. For example, the materials of the invention also comprise useful hydrogen storage materials, since the formation of alloys and compounds between hydrogen and metals can also result in volume expansion. Thus the materials of the invention also provide higher hydrogen storage capacity and greater reversible storage capacity.

Devices and Applications

This invention also comprises electrodes and devices that use the materials of the invention. The materials of the invention are particularly useful as lithium active components of anodes for lithium batteries. Electrodes for lithium ion batteries frequently contain a mixture of several components in addition to the lithium-active material. For instance, a positive electrode (cathode) using $LiCoO_2$ as the lithium active material is a mixture of $LiCoO_2$ powder, organic binder, and an additive such as carbon or graphite that provides additional electronic conduction. Negative electrodes (anodes) using the electroactive material of the invention may be prepared as has been described previously by Idota et al. and Kubota and Tanaka, for example, as mixtures of a lithium-active oxide powder, organic binder, and an additive that provides additional electronic conduction.

The materials of the invention have a particular advantage in having a sufficiently high electronic conductivity that they are useable in an electrode without additives to provide electronic conduction. By not needing such additives, the weight and volumetric charge capacity of an electrode is further increased. This increase is in addition to that conferred by the improved charge capacity of the material alone. Thus the invention also comprises electrodes that contain the lithium-active materials herein described but do not contain a significant quantity of a conduction additive such as carbon or graphite. By not containing a "significant quantity" it is understood that the volume fraction of any such conduction additive in the electrode as it is used in the battery is less than 20%, preferably less than 10%, and more preferably less than 5%.

The anodes of the invention may be used in lithium batteries of the secondary (rechargeable) type, in conjunction with a cathode material that initially contains lithium and which when delithiated has a lower chemical potential for lithium. Such cathodes include intercalation oxides of the alpha sodium oxide structure type or its derivatives, such as $LiCoO_2$, $LiNiO_2$, and $LiMnO_2$, spinel structure oxides such as $LiMn_2O_4$, other ordered rocksalt structure oxides such as the orthorhombic polymorph of $LiMnO_2$, and combinations of these oxides or these oxides doped with other metals. Such a battery is assembled in the discharged state. The materials of the invention can also be lithiated before incorporation into a battery, for instance by an electrochemical insertion of lithium or by chemical lithiation using a lithium compound such as n-butyl lithium, in which case it can be used as the anode in a battery in conjunction with a cathode material that is initially substantially lithium free. Vanadium oxide is such a cathode material. This type of battery is assembled in the charged state, and as such can be used as a primary (disposable) battery as well as a secondary battery. All of the above described batteries can use a liquid electrolyte, a gel electrolyte, or a solid polymer electrolyte.

The materials of the invention can also be used in thin-film batteries in which the electrodes or electrolyte are deposited as a film, since many of the embodiments of the invention are readily prepared by physical vapor or chemical vapor deposition, and many of the materials can be shaped as a substrate or rolled into a thin sheet. Electrodes may be prepared in the form of thick or thin films by depositing the mixed-metal oxide using conventional techniques and subjecting the starting material to partial reduction or oxidation according to the method of the invention. Thin films of less than 100 micrometers may be deposited by sputtering, evaporation, laser ablation or chemical vapor deposition according to accepted processes in the field of physical and chemical deposition. Thicker films may be deposited using thermal spraying, spin-coating, tape-casting, doctor-blading or spray coating a slurry of the fine particle mixed-metal compound starting material, followed by partial reduction or oxidation according to the methods of the invention.

The devices of the invention are used in applications including but not limited to portable consumer electronic products such as laptop computers and cellular telephones, medical devices, stationary applications such as backup power devices, and as batteries for automobiles of internal combustion, hybrid, or electric vehicle type.

The materials comprising the invention are also useful for metal-hydride batteries and hydrogen storage materials, in which the metal alloys readily with hydrogen in high molar fractions. The invention also comprises the use of the subject materials in electrochromic devices such as windows, mirrors, and displays in which the optical properties of the composite, generally prepared in the form of a thin film, are altered upon the electrochemical insertion of alkali ions (including $Li^+$) or protons. The anode of the invention may also be used in primary batteries.

The invention is described with reference to the following examples, which are presented for the purpose of illustration only and which are in no way limiting of the invention.

EXAMPLE 1

Partial Reduction of the Rutile Structure Compound $SbVO_4$ $SbVO_4$ is an example of the class of mixed-metal rutile-structure compounds in which one cation predominantly has a valence of 5+ while the other predominantly has a valence of 3+. We term these oxides "III–V" rutiles. Partial reduction of $SbVO_4$ results in a Sb-metal rich dispersion intimately mixed with or contained within a vanadium oxide host. The resulting metal-oxide composite is useful as an anode.

The Sb—V—O system of oxides, whether or not they crystallize in the rutile structure type, is useful as partial-reduction anodes for several reasons. The oxides of Sb and V are well-separated on the Ellingham diagram, allowing partial reduction of the antimony oxide to antimony metal. Vanadium oxide compounds are known to have good electronic and lithium-ionic conductivity. In fact, some vanadium oxides such as $V_2O_5$ and $V_6O_{13}$ have been used as cathode materials for Li-ion batteries [C. A. Vincent, and B. Scrosati, Modern Batteries, $2^{nd}$ edition, Wiley, New York, 207–209 (1997); M. Wakihara, O. Yamamoto, *Lithium Ion Batteries*, Wiley, New York, 58–56 (1998)], in which they intercalate Li at higher voltages (>~3V) than those utilized in this example. Sb can alloy with Li up to 3 Li per Sb. Moreover, the Sb system is attractive because it can be seen (Table 1) that the molar volume of $Sb_2O_5$ and $Li_3Sb$ are almost equal, which makes the net volume change for reducing $Sb_2O_5$ to metal followed by $Li_3Sb$ formation nearly zero. Initial reduction of antimony oxide to antimony metal allows partial or complete compensation of the volume expansion during subsequent lithiation of Sb metal, and reduces the extent of mechanical failure within the anode.

Figure 2:
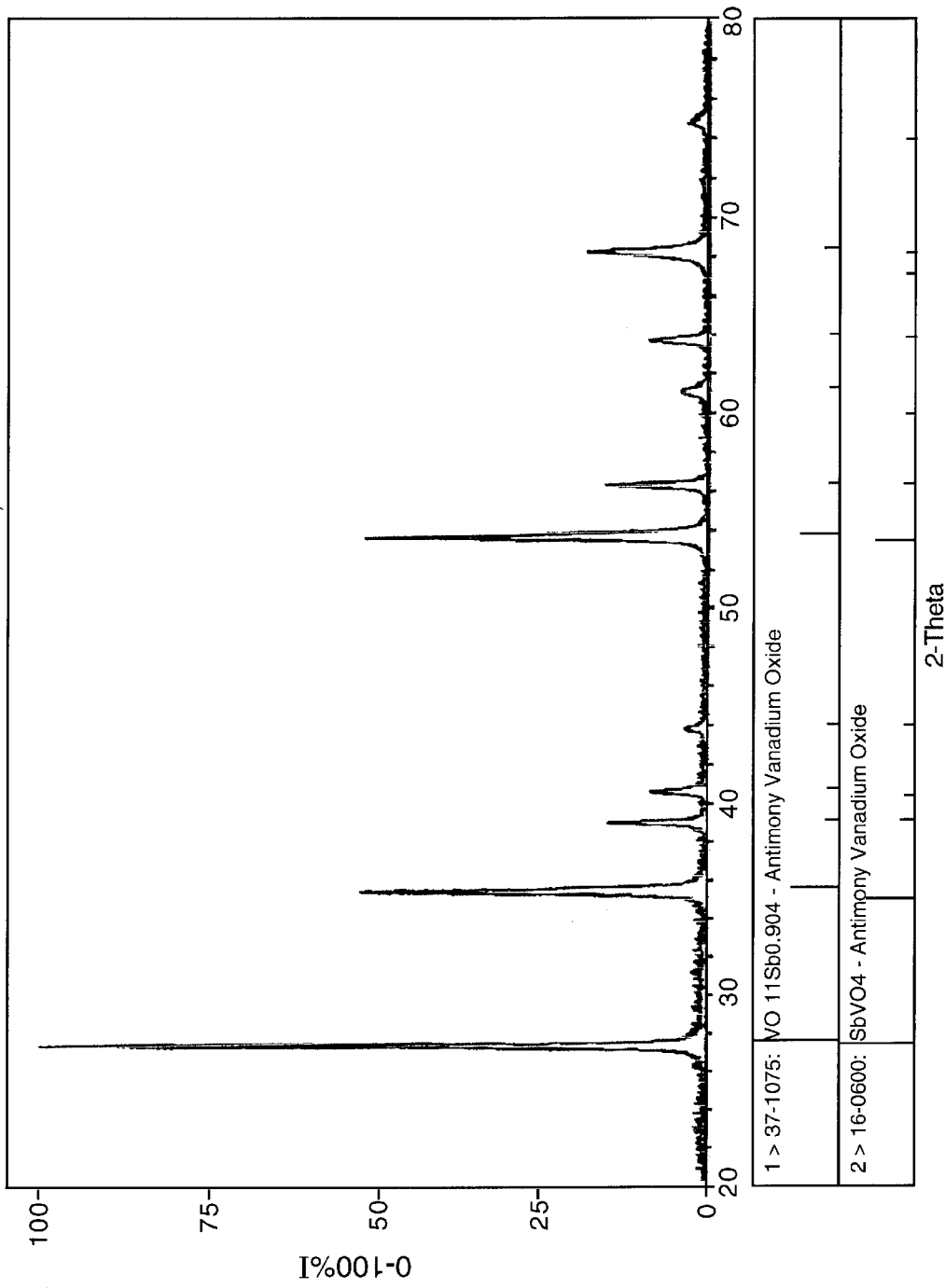
FIG. 2 is an X-ray diffraction pattern for Sample 1 (a rutile-structure $SbVO_4$ as in Example 1) prepared by firing a mixture of $Sb_2O_3$ and $V_2O_5$ in air at 600° C. for 24 h and 700° C. for 24 h (JCPDS references used for phase identification are shown at bottom)

$SbVO_4$, a rutile-structure compound [R. S. Roth and J. L. Waring, "Synthesis and Stability of Bismuto Tantalite Stibiotantalite and Chemically Similar $ABO_4$ Compounds," *Am. Mineral.*, 48, 1348–1356 (1998)], was produced using a solid state reaction method. A 1:1 molar ratio of $Sb_2O_3$ (29.153 g, Alfa Aesar, 99.3% pure) and $V_2O_5$ (18.189 g, Aldrich, 99.6% pure) was mixed in a polypropylene jar with Teflon® milling balls by roller-milling for 24 hours. The mixture was fired in air at 600° C. for 24 h, then at 700° C. for 24 h. The resulting compound was analyzed by X-ray diffraction (XRD) and found to closely match JCPDS files 27–1075 for the compound $V_{1.1}Sb_{0.9}O_4$ and 16–0600 for $SbVO_4$, as shown in FIG. 2. No significant peaks for other crystalline phases were found, indicating that the compound was predominantly a single-phase solid solution. This beige-colored oxide is henceforth referred to as Sample 1.

Figure 3:
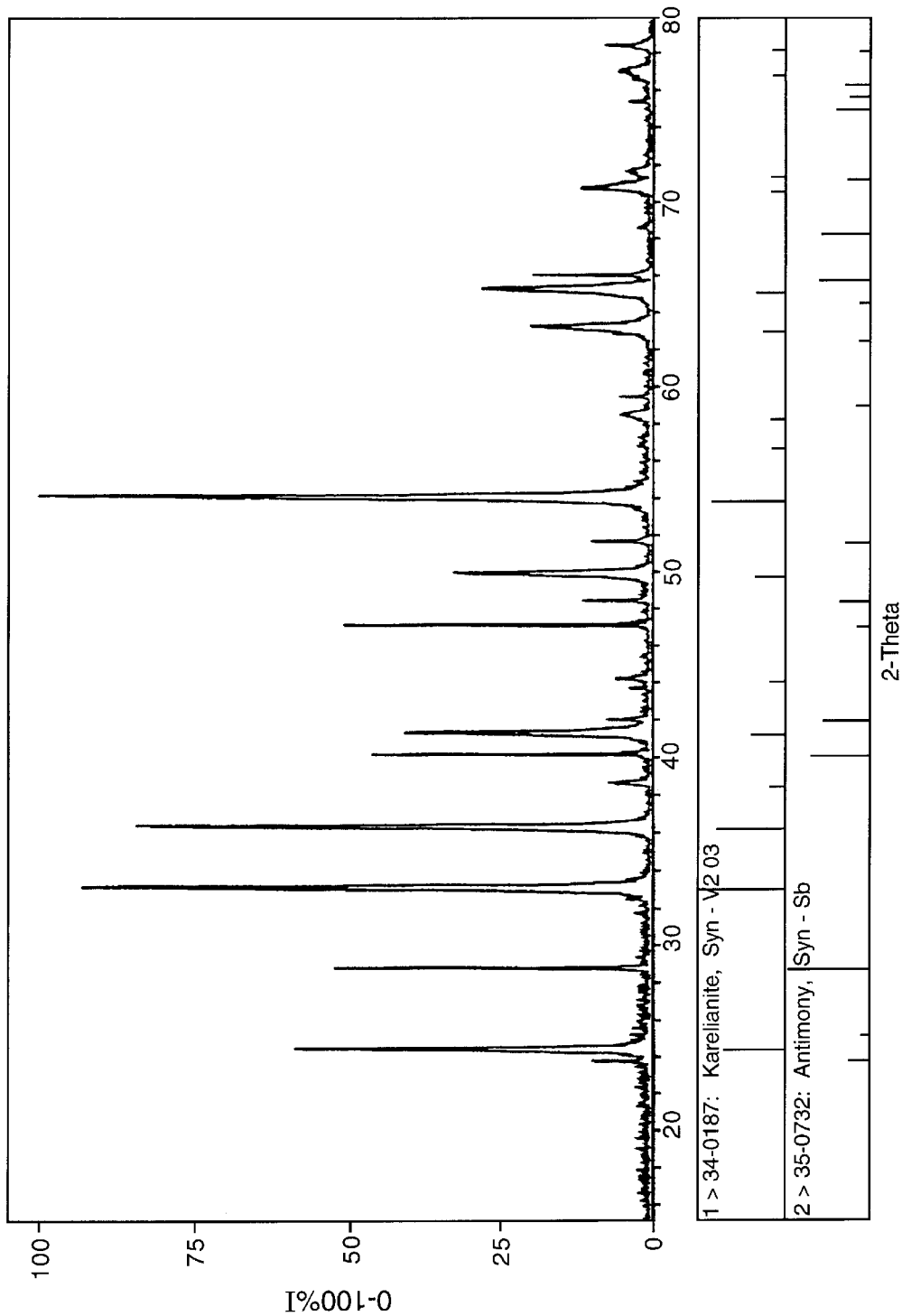
FIG. 3 is an X-ray diffraction (XRD) pattern for Sample 2, a rutile-structure $SbVO_4$ that was reduced to Sb and $V_2O_3$ by heating in a 53:1 mixture of $CO:CO_2$ for 4h at 600° C.(JCPDS references used for phase identification are shown at bottom)
Figure 4:
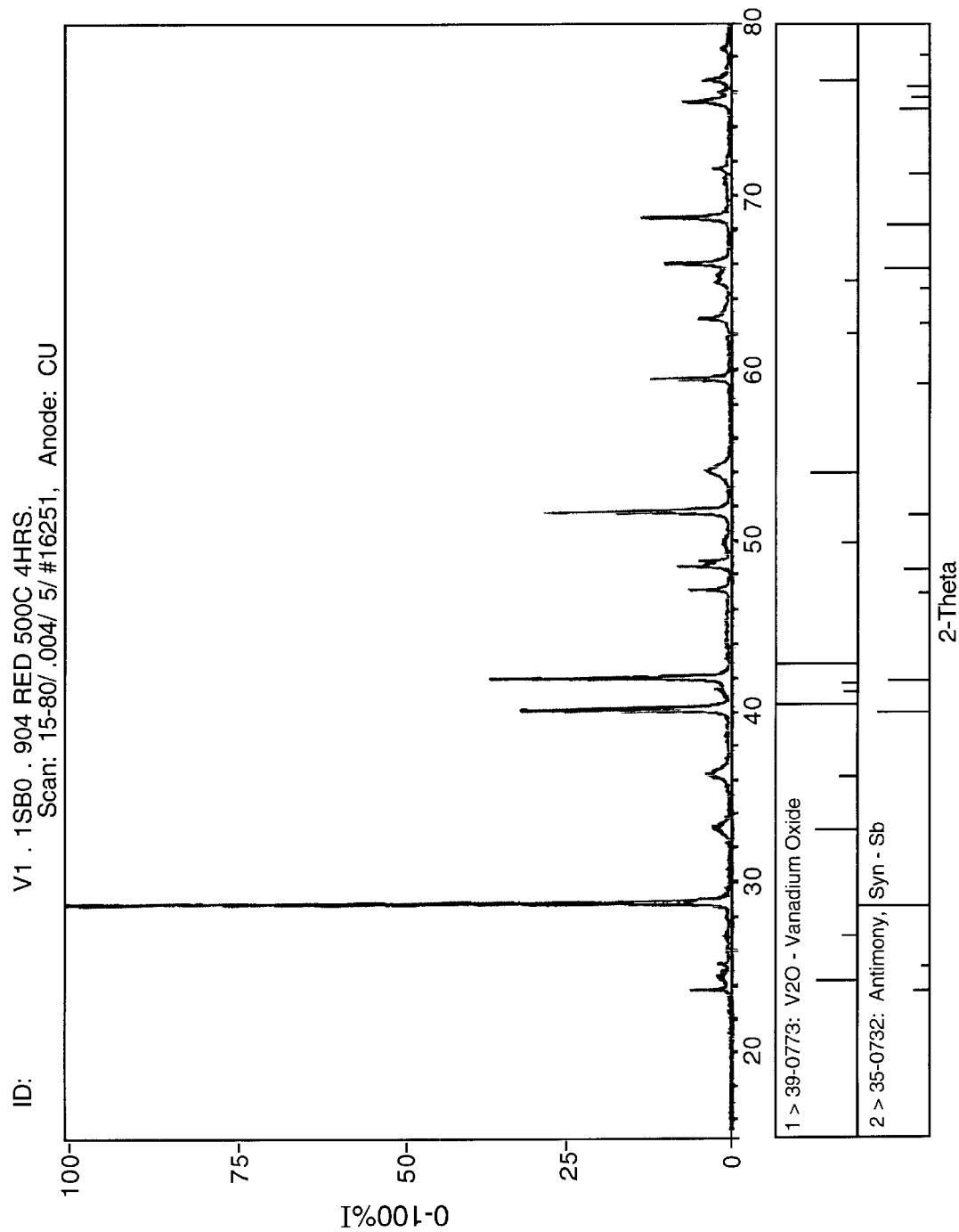
FIG. 4 is an X-ray diffraction pattern for Sample 3, a rutile-structure $SbVO_4$ that was reduced to Sb and $V_2O$ by heating in a 53:1 mixture of $CO:CO_2$ for 4 h at 500° C. (JCPDS references used for phase identification are shown at bottom)

A portion of Sample 1 was fired in a 53/1 mixture of $CO/CO_2$ gas at 600° C. for 4 h. This firing condition yields at equilibrium an oxygen partial pressure of $10^{-28}$ atm, which is sufficient to reduce antimony oxide, but not vanadium oxide, to its respective metal. An x-ray diffractogram of the resulting black powder is shown in FIG. 3. It is seen that the material is predominantly a mixture of Sb metal and $V_2O_3$. This sample is henceforth referred to as Sample 2.

A portion of Sample 1 was fired in a 53/1 mixture of $CO/CO_2$ gas, at 500° C. for 4 h. This firing conditions yields at equilibrium an oxygen partial pressure of $10^{-33}$ atm, which is sufficient to reduce antimony oxide but not vanadium oxide to their respective metals. An x-ray diffractogram of the resulting powder, which is black in color, is shown in FIG. 3. It is seen that the material is predominantly a mixture of Sb metal and $V_2O$. This sample is henceforth referred to as Sample 3.

Note that for both samples 2 and 3, the temperature of reduction is below the melting point of antimony (631° C.), so that the metal produced is in the solid state.

Samples 1, 2, and 3 were tested in electrochemical cells against a lithium metal anode at room temperature. Each electrode was prepared by mixing the respective oxide powder with PVDF binder and graphite in the following volume percentages: 70% of the oxide or metal-metal oxide sample, 10% graphite, and 20% PVDF. For Sample 1, this ratio corresponds to weight percentages of 87.3%, 5.3%, and 7.4% respectively. For Sample 2 the weight percentages are 86.7%, 5.6%, and 7.7% respectively. For Sample 3 the weight percentages are 86.4%, 5.7%, and 7.9% respectively. Thin pellets of 0.25 inch diameter were pressed from each mixture at a pressure of 4 metric tons per square centimeter. A Celgard separator (Hoechst) was used to separate the lithium metal and the sample to be tested. An electrolyte consisting of a 1:1 ratio of ethylene carbonate (EC):dimethyl carbonate (DMC), containing 1 M $LiPF_6$ salt (LP30, EM Industries, Inc.) was used. Charge-discharge curves were measured using an apparatus constructed from National Instruments, Inc., multi-channel modular power supplies, switches and voltmeters. The tests were controlled using Labview™ software.

Figure 5:
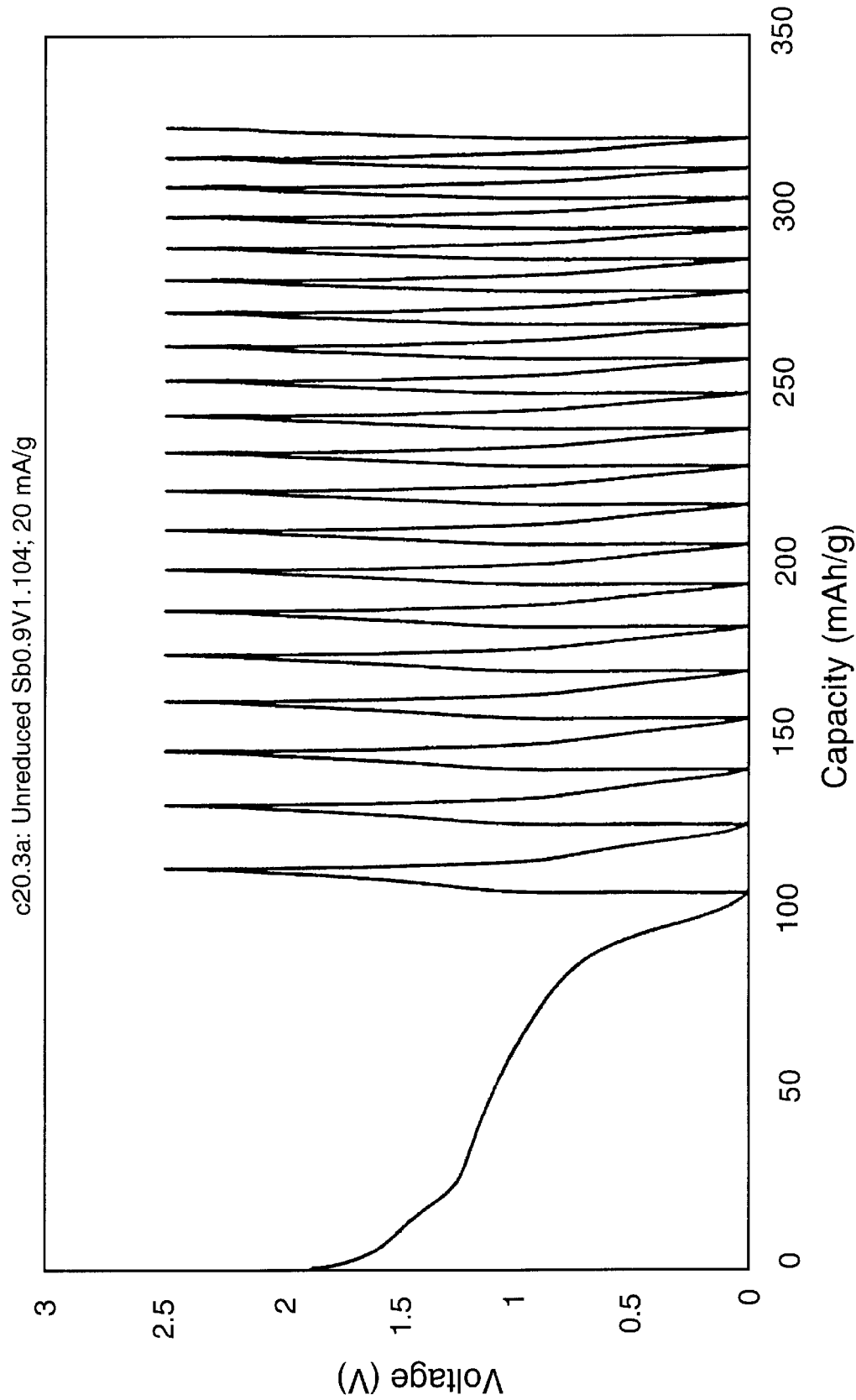
FIG. 5 illustrates charge-discharge results for Sample 1, measured between 0.005 and 2.5V at a current rate of 20 mA per gram of oxide plus carbon.

FIG. 5 shows charge-discharge results from Sample 1, the unreduced oxide, measured between 0.005 and 2.5V at a current rate of 20 mA per gram of oxide plus carbon. It is seen that while the first discharge exhibits a capacity of approximately 108 mAh/g, each of the subsequent charge and discharge curves exhibits a capacity of less than about 10 mAh/g. This first-cycle irreversible loss is indicative of lithium oxide-forming reactions as was observed by Idota et al. and Kubota et al. Thus, it is seen that the unreduced oxide is not capable of reversibly storing a substantial amount of lithium.

Figure 6:
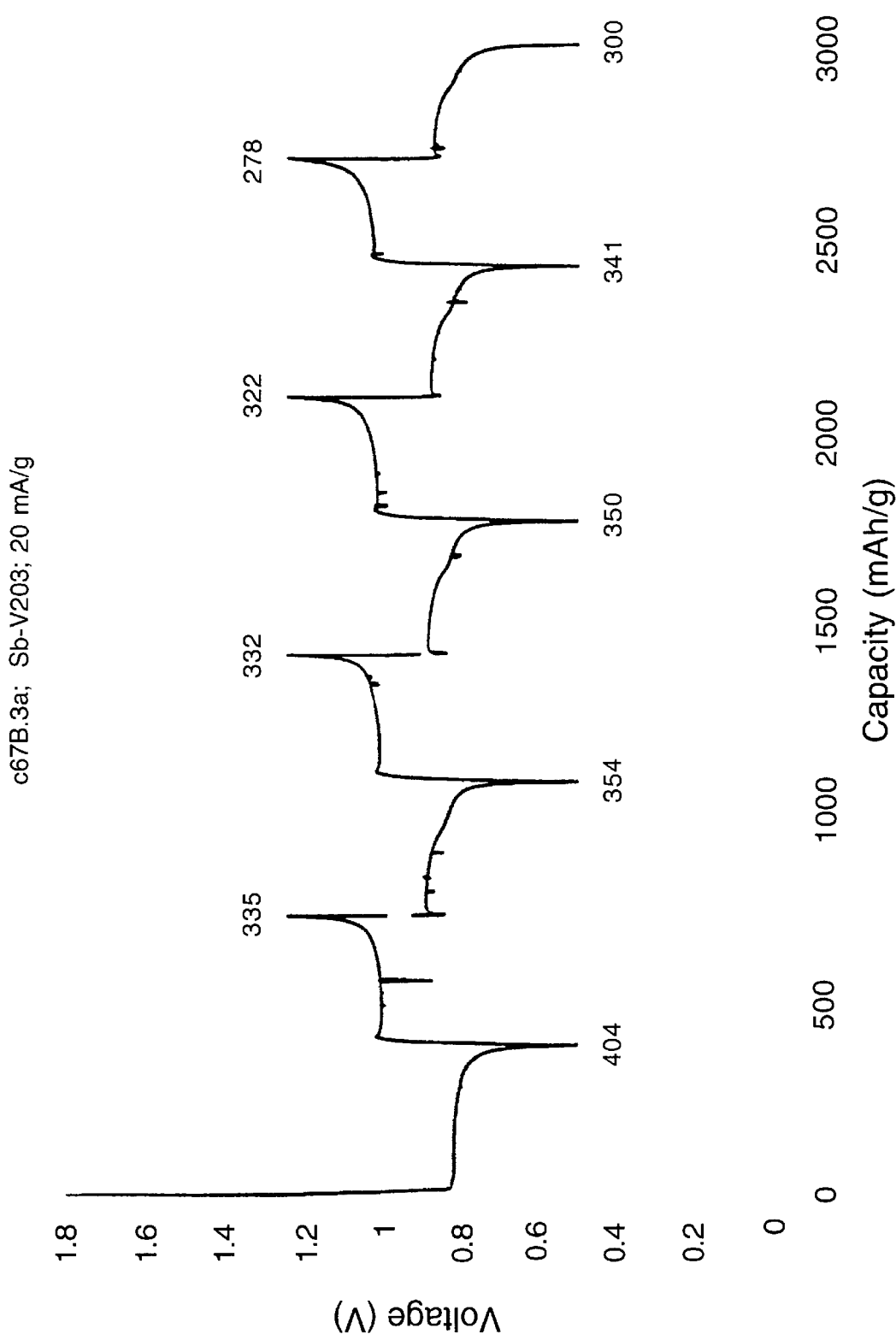
FIG. 6 illustrates charge-discharge results for Sample 2, measured between 0.5 and 1.25V at a current rate of 20 mA per gram of metal-metal oxide material plus carbon (numbers in the figure indicate the charge capacity of each discharge or charge segment in units of mAh/g)

FIG. 6 shows charge-discharge results from Sample 2, the partially reduced Sb+$V_2O_3$ mixture. It is apparent that compared to FIG. 5, a much higher level of charge capacity, which is furthermore reversible, has been achieved. A substantially flat voltage plateau is observed upon both charge and discharge, at 1–1.1 and 0.8–0.9 respectively. The average of the two plateaus is close to that observed for the alloying of Li with Sb, of 0.95 V [D. Fauteux, and P. Koksbang, "Rechargeable Lithium Battery Anodes: Alternatives to Metallic Lithium," *J. Appl. Electrochem.*, 23, 1–10 (1993)]. It is clear that lithium storage is predominantly accomplished by the alloying of lithium with antimony metal.

Note that FIG. 6 furthermore exhibits a much lower first-cycle irreversible capacity loss than the materials of Idota et al. and Kubota et al. The first-charge capacity (first extraction of lithium from the sample) is 83% of the first-discharge capacity (first insertion of lithium into the sample), which is a much higher percentage than the 50%–67% values reported by Idota et al. and Kubota et al.

Note also that FIG. 6 shows that Sample 2 is capable of achieving very nearly the theoretical charge capacity of the Sb+$V_2O_3$ mixture, assuming that Li only alloys with Sb. For a maximum lithium concentration corresponding to the formation of the compound $Li_3Sb$, the theoretical charge capacity of a 1:1 molar ration of Sb:$V_2O_3$ is computed to be 349.1 mAh/g. In FIG. 6, it is seen that the first discharge, (lithium insertion) capacity exceeds this value. The first-charge (lithium extraction) capacity of 335 mAh/g is 96% of the theoretical value.

Note furthermore that Sample 2 exhibits an exceptionally high volumetric charge capacity. The density of a 1:1 molar ratio of Sb:$V_2O_3$ is readily computed to be 5.43 g/$cm^3$. Thus the volumetric charge capacity for the first discharge cycle (weight capacity 404 mAh/g) is 2194 mAh/$cm^3$, and for the first 3 charge cycles (weight capacities of 322–335 mAh/g) is 1749–1819 mAh/$cm^3$.

Thus it is shown that a metal-metal oxide composite material produced by the partial reduction of a starting mixed oxide has utility as a reversible lithium anode of low first-cycle irreversible capacity loss, and high weight and volumetric charge capacity.

Figure 7:
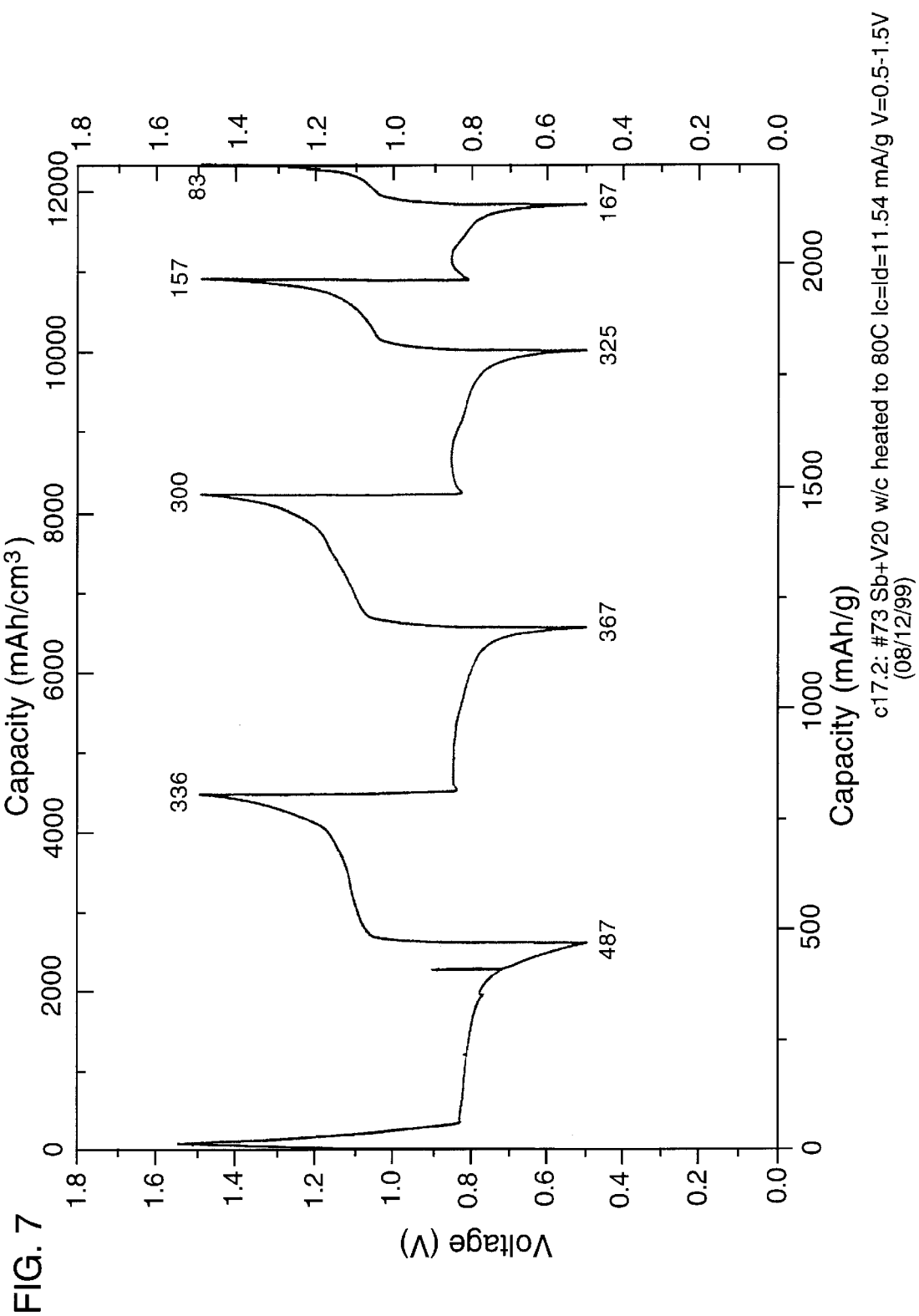
FIG. 7 illustrates charge-discharge results for Sample 3, measured between 0.5 and 1.5V at a current rate of 11.54 mA per gram of metal-metal oxide material plus carbon (numbers in the figure indicate the charge capacity of each discharge or charge segment in units of mAh/g)

FIG. 7 shows charge-discharge results from Sample 3, the partially reduced Sb+$V_2O_3$ mixture. As for Sample 2, the initial charge and discharge capacities as well as the reversibility are much greater than for the unreduced oxide Sample 1, and voltage plateaus corresponding to the alloying of lithium with antimony are seen as approximately the same voltages as for Sample 2. The initial charge capacities are comparable to those for Sample 2 (FIG. 6) on a weight basis, but are even higher on a volumetric basis due to the higher density of Sample 3 (5.57 g/$cm^3$). The first-discharge capacity of 487 mAh/g corresponds to a volumetric capacity of 2713 mAh/$cm^3$, and the first-charge capacity of 336 mAh/g corresponds to a volumetric capacity of 1872 mAh/$cm^3$. Sample 3 exhibits more rapid capacity fade upon cycling than Sample 2. This is attributed to the fact that the vanadium oxide, having undergone greater reduction to $V_2O$ from $V_2O_3$, has reduced its molar volume and thereby allows for less expansion of the Sb metal upon subsequent lithiation. It is clear that variations in heat treatment obvious to those skilled in the art can be used to produce upon partial reduction a vanadium oxide phase that is a mixture of $V_2O_3$ and $V_2O$, or other vanadium oxides, allowing further optimization of the materials of the invention.

Through the example, it is understood that any mixed-metal rutile structure compound $ABO_4$ containing at least two cations A and B which together have a formal valence of about 8+, and in which A has a less negative free energy of oxidation than B, and is furthermore able to alloy with Li, can be preferentially reduced to a metal-metal oxide mixture that is useful as an anode. It is understood that solid solutions containing more than two cations A and B can also be preferentially reduced to form a composite anode.

The preparation described in this example may be readily applied to other "III–V" oxides regardless of whether or not they crystallize in the rutile structure type, as long as one component can be preferentially reduced to the metal. Such oxide include $SbTaO_4$, $SbNbO_4$, $BiTaO_4$, and $BiVO_4$. It is also understood that solid solutions of any one structure type containing more than two metals is an embodiment of the invention.

EXAMPLE 2

Phase Separated and Partially Reduced $TiO_2$—$SnO_2$.

This examples demonstrates the partial reduction of a phase separated mixed-metal oxide material and measures its ability to repeatedly electrochemically cycled.

Ellingham diagrams available to those skilled in the art show that the line Sn+$O_2$=$SnO_2$ lies above that for Ti+$O_2$=$TiO_2$. At 1000° C., an oxygen partial pressure of less than $10^{-14}$ atmospheres will reduce $SnO_2$ to Sn metal, while an oxygen partial pressure greater than $10^{-27}$ atmospheres will oxidize Ti to $TiO_{2-x}$. There is therefore a wide range of oxygen partial pressure between these boundaries where the $SnO_2$ component of the microphase separated oxide can be reduced while the $TiO_2$ component remains oxidized. $CO/CO_2$ gas mixtures can readily be used to achieve these oxygen partial pressures, with mixture between approximately 1:1 and $10^7$:1 being suitable at 1000° C.

Figure 8:
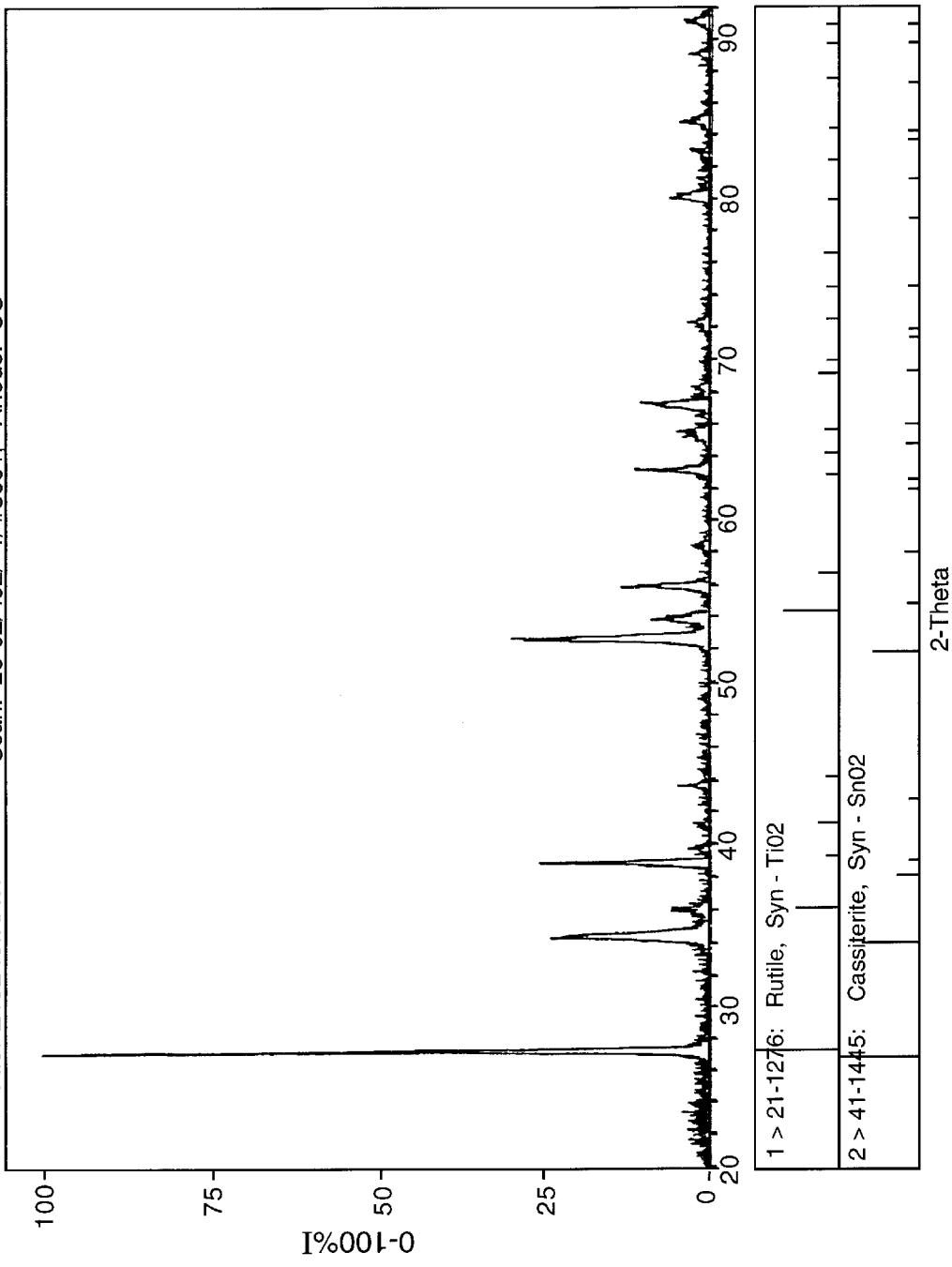
FIG. 8 is an XRD pattern for Sample 4, an Al-doped $(Ti,Sn)O_2$ solid solution heat treated at 900° C. for 12 h in air to allow phase separation (JCPDS references used for phase identification are shown at bottom)
Figure 9:
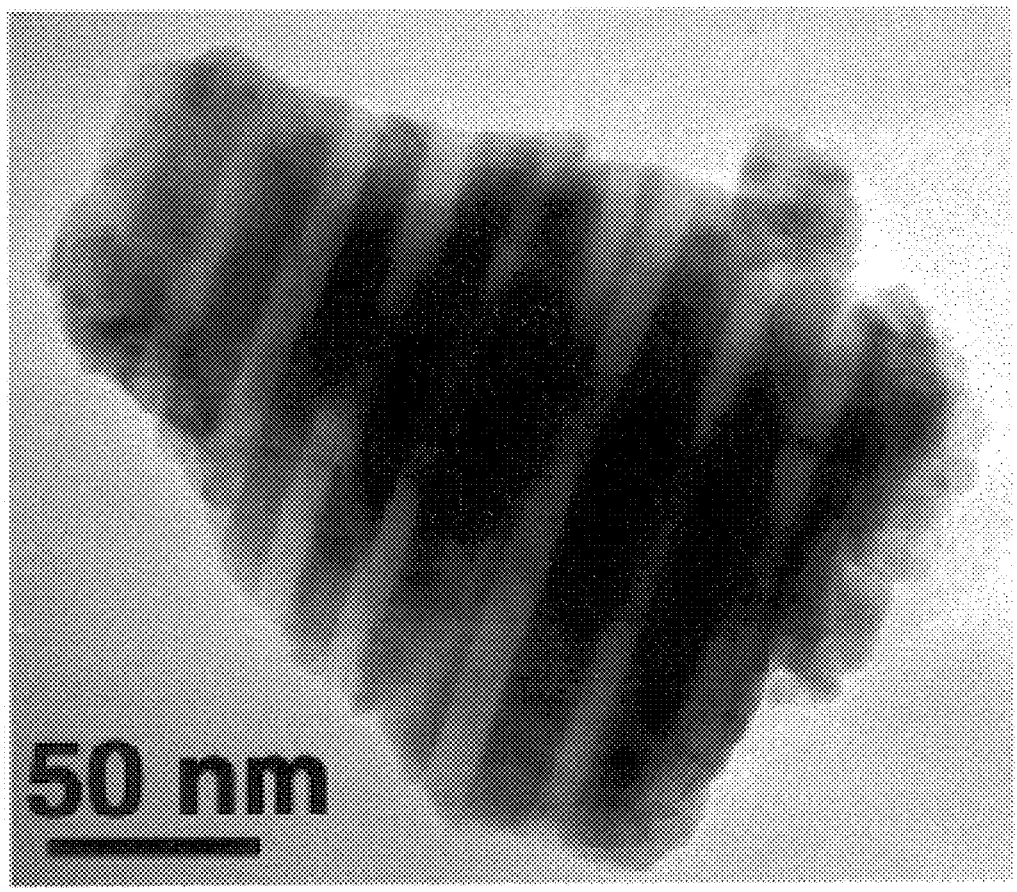
FIG. 9 is a transmission electron microscope (TEM) image (bright field) of Sample 4 showing a lamellar microphase-separated structure in which the dark regions are $SnO_2$-rich and the light regions are $TiO_2$ rich, and in which the average width of the individual lamellae is approximately 20 nm.

For one series of samples, a mixed oxide containing 46 cation mole % each of Sn and Ti, and 8 cation mole % Al, was prepared by mixing together 75.344 g $SnO_2$ powder (Alfa Aesar, 99.9% pure), 39.950 g $TiO_2$ powder (Alfa Aesar, 99.9% pure) and 0.312 g $Al(OH)_3$. The powder was mixed by roller-milling for 24 hours in a polyproplyene jar with Teflon milling balls, after which it was heated to 1475° C. for 12 hours in air, a sufficiently high temperature to achieve a solid solution. The powder was then heated to 900° C. for 12 hours in air to allow phase separation. The X-ray diffractogram of this sample, FIG. 8, shows clearly that the principle phases are rutile structure $TiO_2$ and $SnO_2$. A transmission electron microscope image of this sample, FIG. 9, shows a lamellar microstructure that according to Maruyama et al. is characteristic of a (Ti,Sn)$O_2$ solid solution which has undergone phase separation by annealing within the immiscibility field of the phase diagram. The average width of the platelets in the microstructure is only about 20 nm, the dark platelets being $SnO_2$ rich while the bright platelets are $TiO_2$ rich. The beige-colored powder was then mechanically milled using a Spex-mill and zirconia milling jar and milling ball for 15 minutes. This unreduced oxide material is hereafter referred to as Sample 4.

Figure 10:
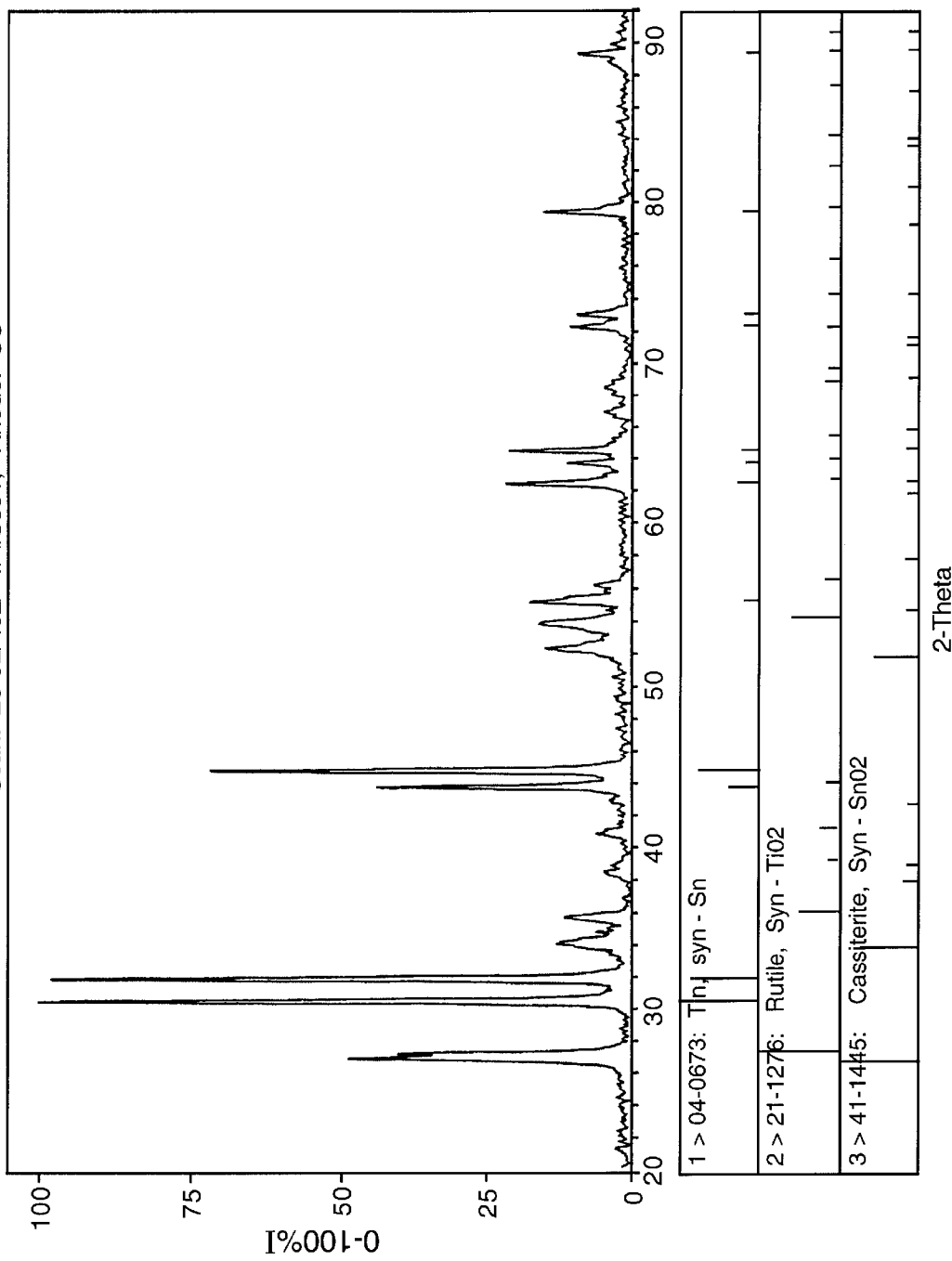
FIG. 10 is an XRD pattern for Sample 4 after a reducing heat treatment at 360° C. for 15 hours in flowing hydrogen which demonstrates, when compared with FIG. 8, that the $SnO_2$ phase has been predominantly reduced to Sn metal (JCPDS references used for phase identification are shown at bottom)

The phase separated oxide of Sample 4 was subjected to various heat treatments designed to produce internal reduction. After a reducing heat treatment at 360° C. for 15 hours in flowing hydrogen gas (with an initial temperature overshoot of the furnace to about 440° C.), X-ray diffraction, FIG. 10, showed that the peaks for the $SnO_2$ phase was markedly diminished and that strong peaks due to Sn metal phase had appeared. The powder was now black in color.

Figure 11:
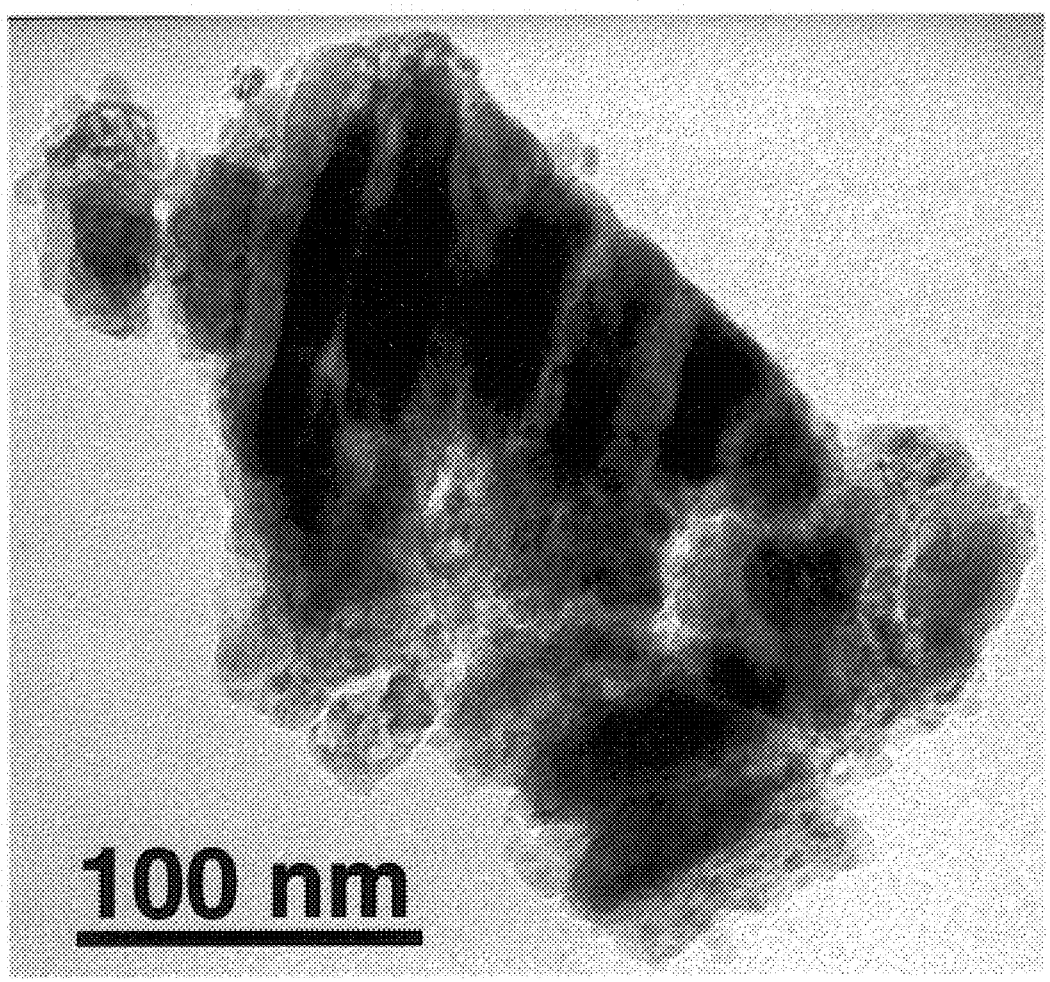
FIG. 11 is a TEM image (bright field) of the internally reduced sample in FIG. 10 showing that the Sn metal is finely dispersed in the lamellar regions initially occupied by $SnO_2$.

FIG. 11 shows a transmission electron microscope image of this reduced material. It is seen that the $SnO_2$ platelets have now been reduced to Sn metal, as indicated by the X-ray diffraction, and that a majority of the reduced metal appears internally within the initial particle of phase-separated oxide. FIG. 11 shows that the process of internal reduction has resulted in internal void space, and also the presence of strain contours, which show that the material is in a state of internal stress as specified by the invention. Even though the temperature of reduction is above the melting point of tin (232° C.), so that the tin forms as a liquid, the tin remains entrapped within the confines of the lamellar regions and is maintained as a fine dispersion.

Another portion of Sample 4 was subjected to a reducing heat treatment at 900° C. for 2 hours in a 100/1 mixture of $CO/CO_2$, which yields at equilibrium an oxygen partial pressure of about 10–20 atmospheres. This higher temperature heat treatment is understood to result in greater coarsening of the Sn metal, as the reducing temperature is well above the Sn melting point of 232° C., and in the partial or complete relaxation of internal stresses produced by reduction. This material is hereafter referred to as Sample 5. Another portion of Sample 4 was subjected to a reducing heat treatment at 360° C. for 3 hours in flowing hydrogen gas (with an initial temperature overshoot of the furnace to about 440° C.), resulting in a material with substantial amounts of Sn metal as shown by X-ray diffraction. This material is hereafter referred to as Sample 6.

Figure 12:
FIG. 12 is a scanning transmission electron microscope (SEM) image (bright field) of a 1:1 $TiO_2:SnO_2$ solid solution doped with 1 cation mole % Ta, after heat treating at 876° C. for 48 hours in air to allow phase separation (note the finer scale of phase separation compared to FIG. 9)

In order to achieve a still finer dispersion of Sn metal, and also to provide greater electronic conductivity to the resulting material, Ta-doped $(Ti,Sn)O_2$ materials were also prepared. FIG. 12 shows a scanning transmission electron microscope image of the very fine-scale phase separation that is characteristic of $(Ti,Sn)O_2$ doped with 1 cation mole % Ta. This sample had been fired at 1500° C. in air to achieve a solid solution, then at 876° C. for 48 hours to allow phase separation. Note that compared to the Al-doped material in FIG. 9, the width of the lamellae is less than 10 nm.

Two different methods were used to prepare Ta-doped $(Ti,Sn)O_2$. In the first, a powder of $(Ti,Sn)O_2$ with a 1:1 mole ratio of Ti,Sn, and doped with 0.6 cation mole % Ta, was prepared from chlorides of each of the respective metals using a coprecipitation method described by Maruyama et al. The mixing was done in a 600 ml polyethylene beaker. Approximately 8 cc of a stoichiometric ratio of high purity $TiCl_4$ (99.999% Alfa Aesar) and $SnCl_4$ (99.99% Alfa Aesar) was poured over ice (made from ~10 $cm^3$ of deionized water). Ice was used to chill the highly exothermic reaction that can otherwise occur. The mixture was stirred thoroughly using a Teflon®-coated stir bar. After stirring, the solution was doped with 0.6 cation mol % of Ta, added as the chloride. 10 $cm^3$ water was then added, and the solution was thoroughly stirred. The precipitation sequence was started by slowly adding 40–50 $cm^3$ of an aqueous solution containing 50% by volume $NH_4OH$ (Alfa Aesar) and 50% by volume deionized water to the initial solution. As this basic solution was slowly added, the solution started to precipitate. White viscous gel was observed at the bottom of the beaker and the stir bar became immobile. An addition of 80 $cm_3$ of water allowed stirring to resume. At this point, the pH of the solution was measured to be about 9. The precipitate was left stirring for more than an hour. The washing step was started by adding more water to fill the 600 $cm^3$ beaker. The solution was stirred for a few hours longer before it was left for approximately 1.5 h to complete precipitation. After the mixture had precipitated and settled, the clear supernatant solution was discarded and the beaker was refilled with water for the next wash. This washing process was repeated for 5 times before the precipitate was dried. The dried precipitate was then calcined in air at 600° C., pressed into pellets, and fired in air at 1500° C. in order to form a solid solution. The solid solution was then phase-separated by firing at various times and temperatures. A material hereafter referred to as Sample 7 was phase-separated by firing at 1100° C. for 18 hours in air, following which it was Spex-milled for 15 minutes, then reduced to create an Sn metal phase by firing at 360° C. for 40 hours in flowing hydrogen (with an initial temperature overshoot of about 440° C.). X-ray diffraction was used to confirm the appearance of Sn metal phase after the partial reduction heat treatment.

The second method of preparing Ta-doped $(Ti,Sn)O_2$ used the mixed-oxides procedure described above for Sample 4. A composition containing 1 cation mole % Ta was made using the same amounts of $SnO_2$ and $TiO_2$ as in the case of Sample 4, with the Ta-doping being accomplished by adding the necessary amount of $Ta_2O_5$ (99.993%, Puratronic). The mixed powder was fired at 1500° C. for 12 hours in air, after which X-ray diffraction confirmed the existence of a single-phase rutile solid solution. This solid solution was then fired at 1000° C. for 136 hours in air to achieve phase-separation. The longer firing time and lower firing temperature compared to Sample 7 result in a greater enrichment of Sn and Ti in the two oxide phases respectively, while retaining a substantially unchanged length scale of phase separation. Thus this material exhibits, after partial reduction of the $SnO_2$-rich phase to Sn metal, a higher Sn fraction than Sample 7 while retaining the very fine dispersion of phases exemplified by FIG. 12. The phase-separated powder of this sample was Spex-milled for 20 minutes, and then reduced at 360° C. for 52 hours in flowing hydrogen (with an initial temperature overshoot to about 440° C.) to produce a very fine dispersion of Sn metal. This material is hereafter referred to as Sample 8.

Sample 4, the unreduced oxide, and Samples 5–8, the partially reduced materials containing a fine dispersion of Sn metal, were each then prepared as pellets for testing in electrochemical cells using the procedure described in Example 1, except that acetylene black was used in place of carbon black.

Figure 13:
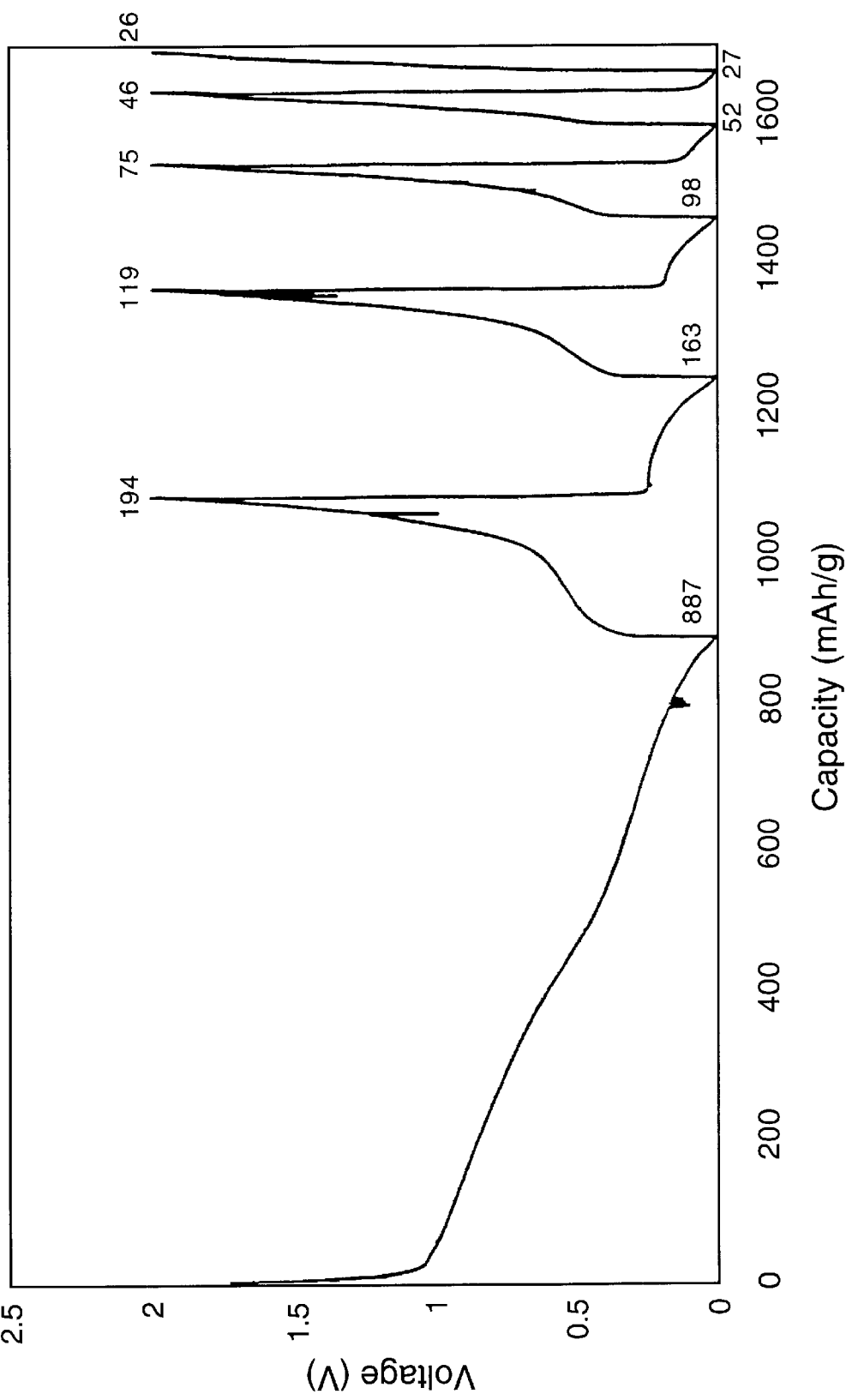
FIG. 13 illustrates voltage vs. cumulative charge capacity results for several charge-discharge cycles of Sample 4 between 0.005–2V at a current rate of 60 mA/g.

FIG. 13 shows voltage vs. cumulative. capacity results over a number of charge-discharge cycles for Sample 4, the phase-separated but not reduced oxide, tested between 0.005–2V at a current rate of 60 mA/g. The sample exhibits a high first-discharge capacity of 887 mAh/g, but a low first-charge capacity of only 195 mAh/g, yielding a first-cycle irreversible capacity loss of 692 mAh/g. The first-charge capacity is only 28% of the first discharge capacity. The large first-cycle irreversibility that this sample exhibits is characteristic of tin-containing oxide anodes. This sample also exhibits rapid capacity fade, decreasing to 27–26 mAh/g in the fourth cycle. As shown in the following results, partial reduction greatly reduces the first cycle irreversibility and improves the reversibility in subsequent cycles.

Figure 14:
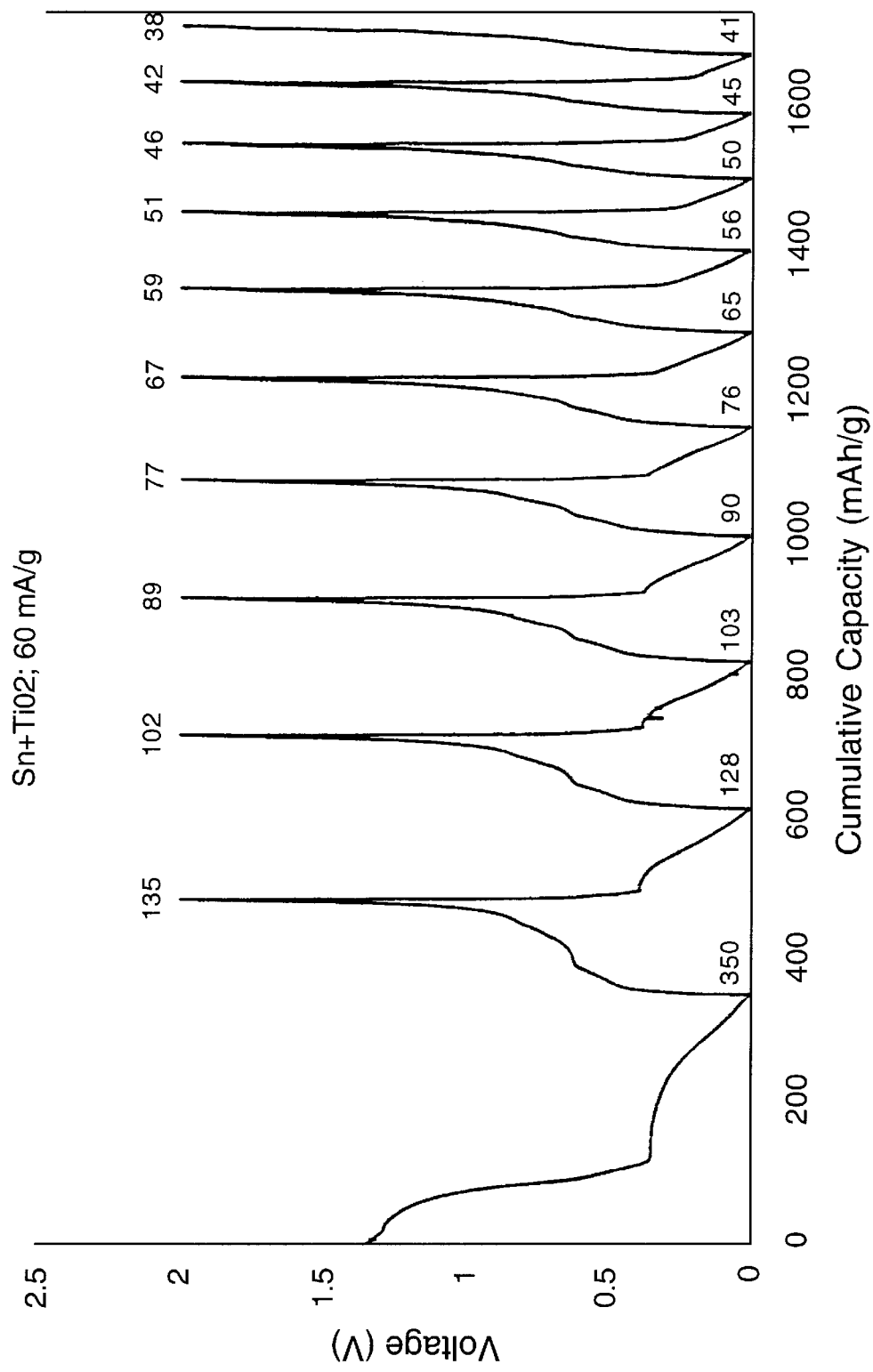
FIG. 14 illustrates voltage vs. cumulative charge capacity results for several charge-discharge cycles of Sample 5 between 0.005–2V at a current rate of 60 mA/g.

FIG. 14 shows voltage vs. cumulative capacity results over a number of charge-discharge cycles for Sample 5, the Al-doped phase-separated $(Ti,Sn)O_2$ that was partially reduced at a high temperature of 900° C. This sample was also tested between 0.005–2V at a current rate of 60 mA/g. In this material the first-charge capacity has now increased to 39% of the first discharge capacity, and the percentage capacity loss upon cycling is improved relative to Sample 4 (FIG. 13). Notice that the first-discharge curve shows two distinct plateaus, one at 1.2–1.3V and a second at 0.3–0.4V.

The first is close to the voltage at which $TiO_2$ is known to intercalate lithium. This plateau appears prominently in the first discharge, but not in subsequent charge or discharge curves. It is understood that at the relatively high charge-discharge current rates used here, irreversible incorporation of lithium within the $TiO_2$ phase may contribute to the first-cycle irreversibility. These two voltage plateaus are more distinct for this sample than the following ones, due to the high reduction temperature resulting in greater coarsening and the relief of internal stresses.

Figure 15:
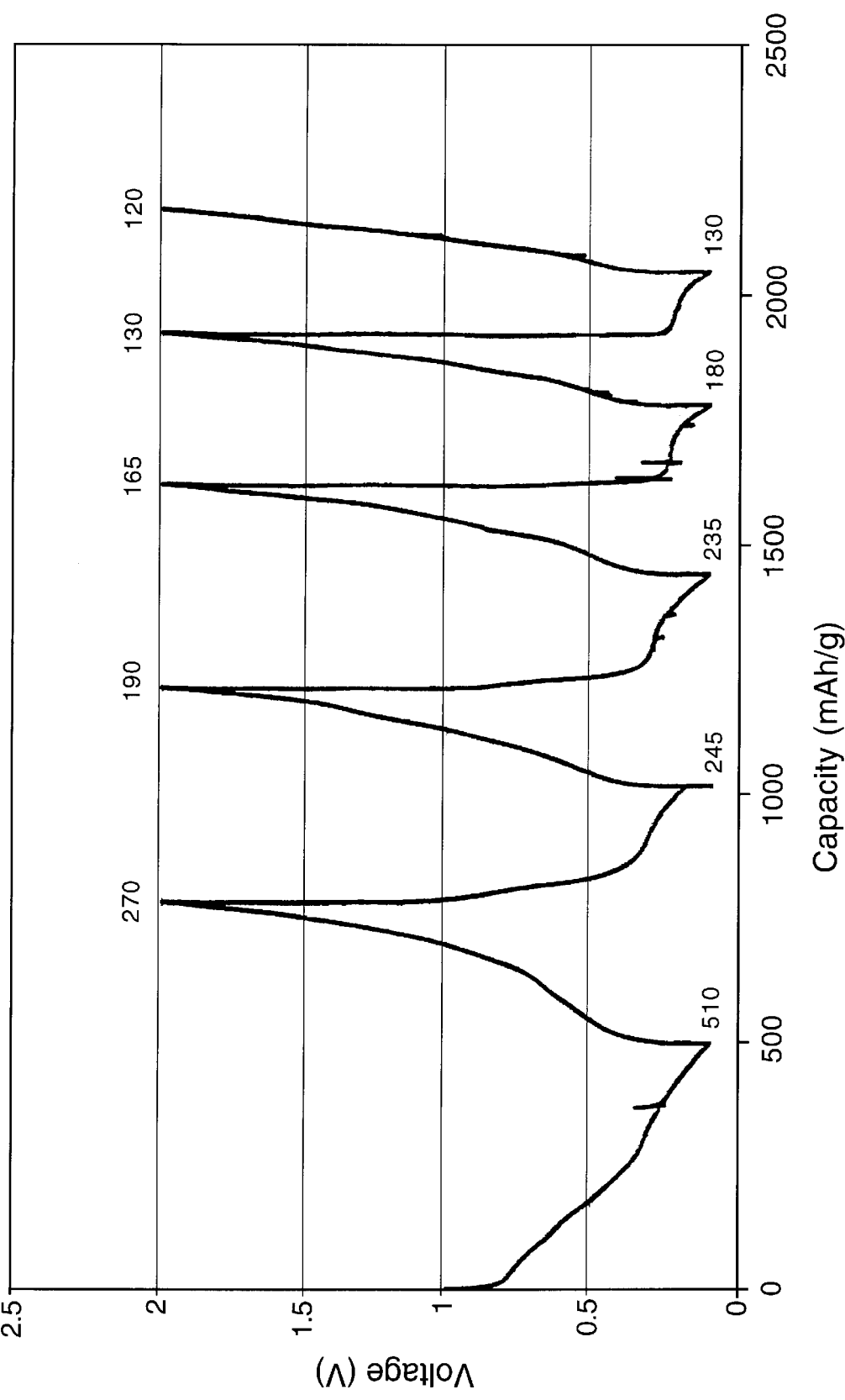
FIG. 15 illustrates voltage vs. cumulative charge capacity results for several charge-discharge cycles of Sample 6, between 0.1–2V at a current rate of 20 mA/g.

FIG. 15 shows voltage vs. cumulative capacity results over a number of charge-discharge cycles for Sample 6, the Al-doped phase-separated $(Ti,Sn)O_2$ that was partially reduced at a lower temperature of 360° C., resulting in a finer dispersion of Sn metal and greater state of internal stress as compared to Sample 5. This cell was tested over the voltage range 0.1–2V at a current rate of 20 mA/g. Notice that this sample exhibits a still lower first-cycle irreversibility compared to Sample 4 (FIG. 13) and Sample 5 (FIG. 14), the first-charge capacity being 53% of the first-discharge capacity, and still further improved capacity retention. The improved first-cycle reversibility corresponds to the fact that the voltage plateau at 1.2–1.3V has now essentially disappeared.

Figure 16:
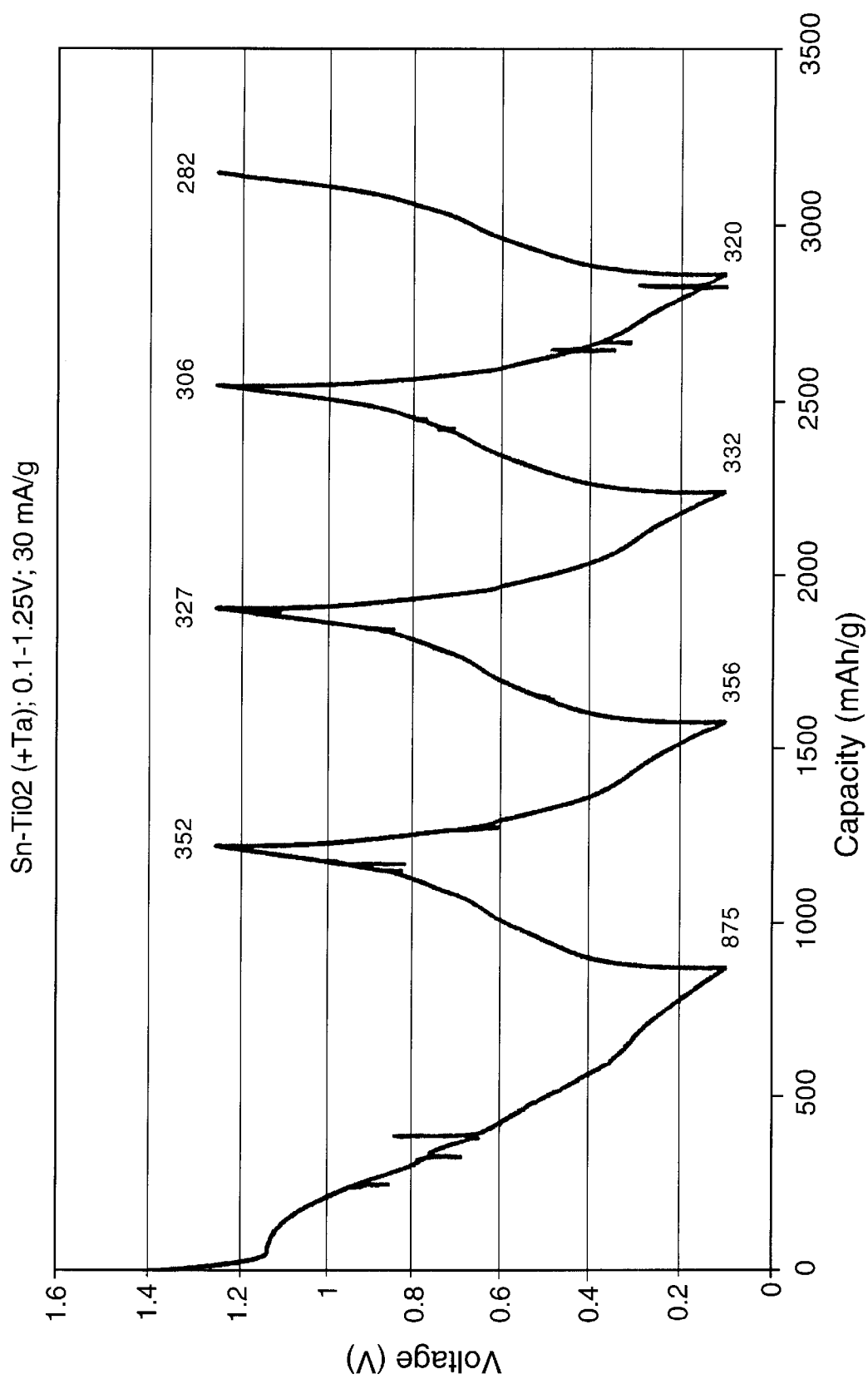
FIG. 16 illustrates voltage vs. cumulative charge capacity results for several charge-discharge cycles of Sample 7 between 0.005–2V at a current rate of 60 mA/g.

FIG. 16 shows voltage vs. cumulative capacity results over a number of charge-discharge cycles for Sample 7, the Ta-doped and partially reduced material. This sample was tested between 0.1–1.25 V at a current rate of 30 mA/g. Compared to the results in FIGS. 13–15, the charge and discharge capacities are higher still and the capacity retention upon cycling is further improved. These improvements in properties demonstrate the benefit of finer dispersions of Sn metal achieved using the materials and processes of the invention. Furthermore, a lesser degree of polarization in the test cell is indicated by the smaller difference in voltage between the charge and discharge curves. This is attributed to the increased electronic conductivity provided by donor doping.

Figure 17:
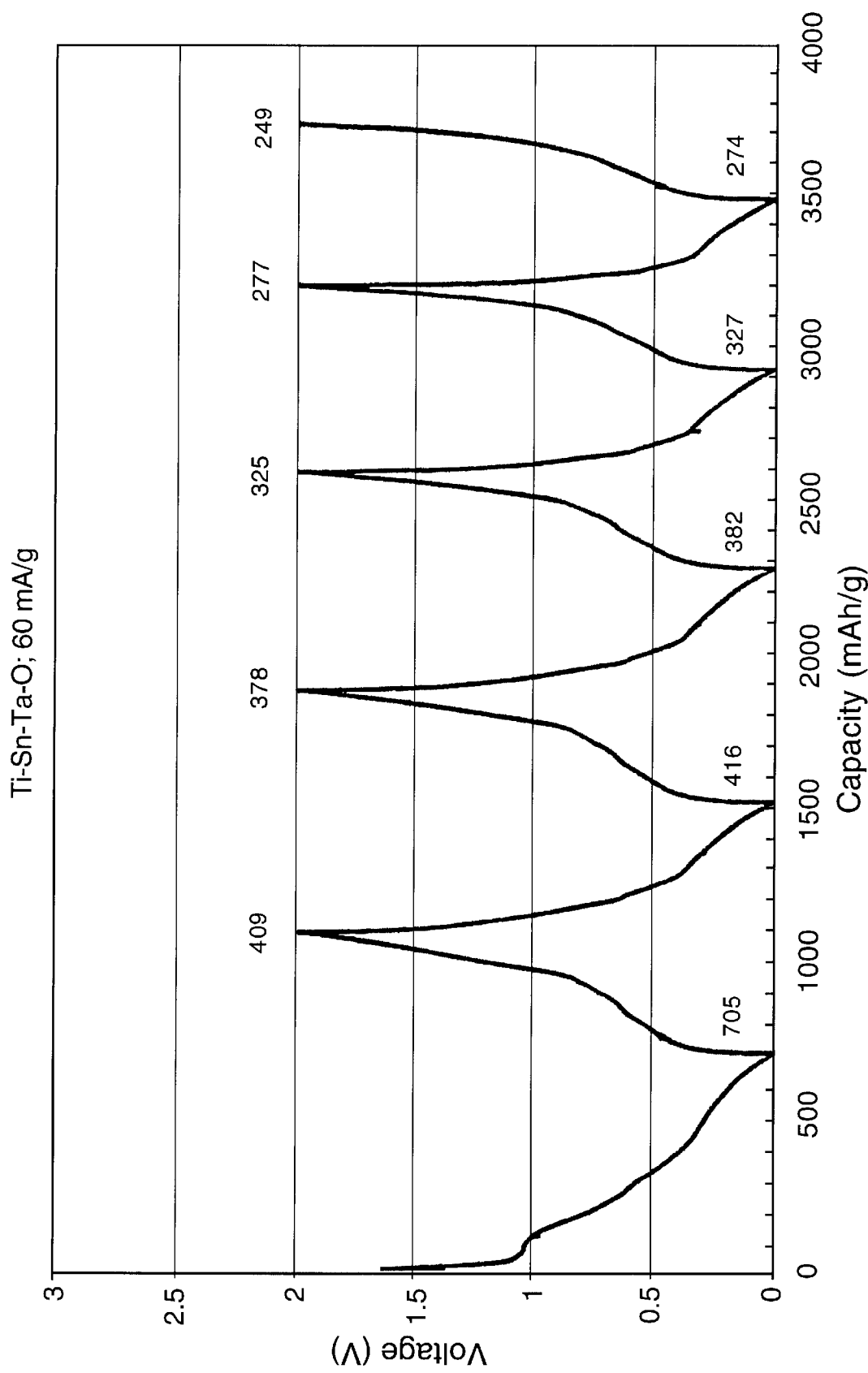
FIG. 17 illustrates voltage vs. cumulative charge capacity results for several charge-discharge cycles of Sample 8 between 0.005–2V at a current rate of 100 mA/g.

FIG. 17 shows voltage vs. cumulative capacity results over a number of charge-discharge cycles for Sample 8, the second Ta-doped material. This sample was tested between 0.005–2V at a current rate of 60 mA/g. This sample exhibits the highest first-cycle capacity retention (58%) and the highest charge capacity values of the samples in this Example, thereby demonstrating the benefit of very fine scale, yet compositionally complete phase separation of the initial oxide, followed by more complete reduction of the $SnO_2$ phase.

Thus the results of this Example show that partial reduction of a phase-separated oxide yields a metal-metal oxide electrode material with improved charge capacity, as well as improved resistance to capacity loss upon electrochemical cycling. They also show that a finer dispersion of the resulting metal phase can be achieved by varying the starting materials and heat treatment procedures so as to attain a finer scale of phase-separation. This is exemplified by the donor-doped $(Ti,Sn)O_2$ of Samples 7 and 8. Improved electrochemical performance results. The results show that it is preferable that the thinnest dimension of the initial oxide phase and resulting metal be less than 10 nm. The results from the donor-doped materials also demonstrate the benefits of increasing the electronic conductivity within the remaining rutile oxide phase.

The volumetric capacity of the partially reduced materials is readily estimated by approximating the material as a two-phase $Sn-TiO_2$ mixture with a 1:1 molar ratio of the two phases, based on the known starting compositions. Such a mixture has a density of about 5.68 $g/cm^3$. Thus weight capacities of 300 and 400 mAh/g, as are exhibited by the samples, corresponds to volumetric capacities of 1703 and 2272 $mAh/cm^3$, respectively. For a sample weight capacity of 300 mAh/g, the weight capacity of the tin metal fraction is computed to be 502 mAh/g, and the concentration of the alloy $Li_xSn$ that is formed is x=2.22.

From the results of this example, it is understood that further refinements of composition and heat treatment following procedures familiar to those skilled in the art will lead to further improvements in weight and volumetric capacity, and capacity retention upon cycling. In particular, it is understood that the reversibility of the metal-based electrodes is strongly dependent on the voltage range over which cycling occurs. Thus, it is anticipated by those skilled in the art that cycling over a narrower range of voltages, such as one that maintains a single lithium-tin phase, will improve capacity retention.

EXAMPLE 3

Internal Reduction of a Copper-Manganese Mixed Oxide

Figure 18:
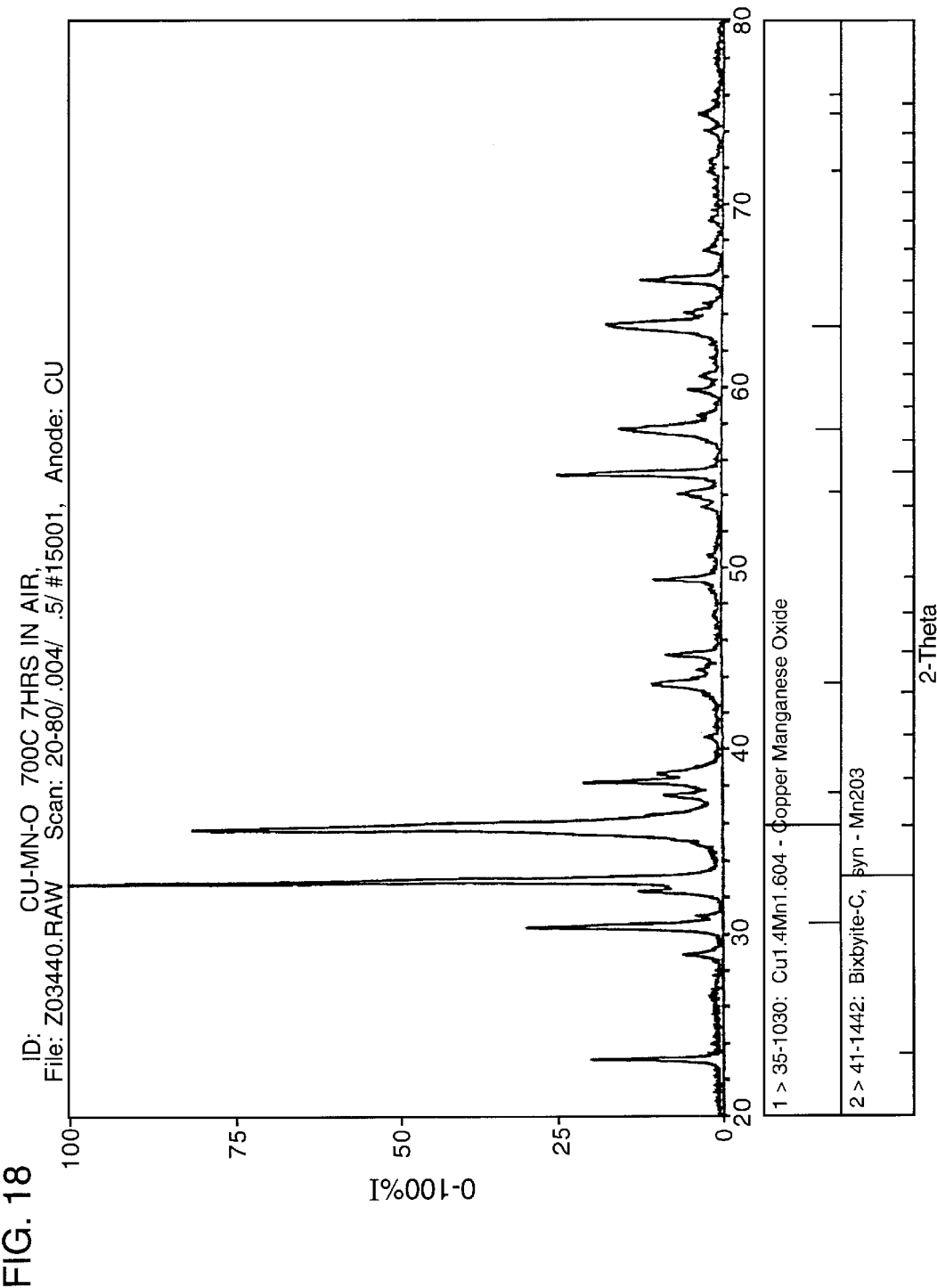
FIG. 18 is and XRD pattern for a copper manganese oxide mixture with a 1:2 molar ratio of copper to manganese, fired at 700° C. for 7 h.

Copper-manganese oxide was prepared by a solid state reaction method. Powders of CuO (99.9% Alfa Aesar) and MnO (99.5% Alfa Aesar) powder were mixed in a 1:2 molar ratio in a polyethylene bottle using teflon balls. The overall composition was one that would yield the spinel $CuMn_2O_4$ if only a single phase of oxide formed and the Cu and Mn are in oxidation states that combined produce a metal ion valence of approximately $8^+$. The jar was rolled on a ball mill for 24 hours to insure homogenous mixing. After milling the mixture was put in a platinum crucible and was slowly heated in air to 700° C. The mixture was held at that temperature for 7 hours before it was slowly cool to room temperature. The powder obtained after heating had a dark brown, almost black appearance. X-ray diffraction of this material, FIG. 18, showed that it was a mixture of copper-manganese oxide of the spinel structure, closely matching JCPDS file 35–1030 for $Cu_{1.4}Mn_{1.6}O_4$, and $Mn_2O_3$.

Figure 19:
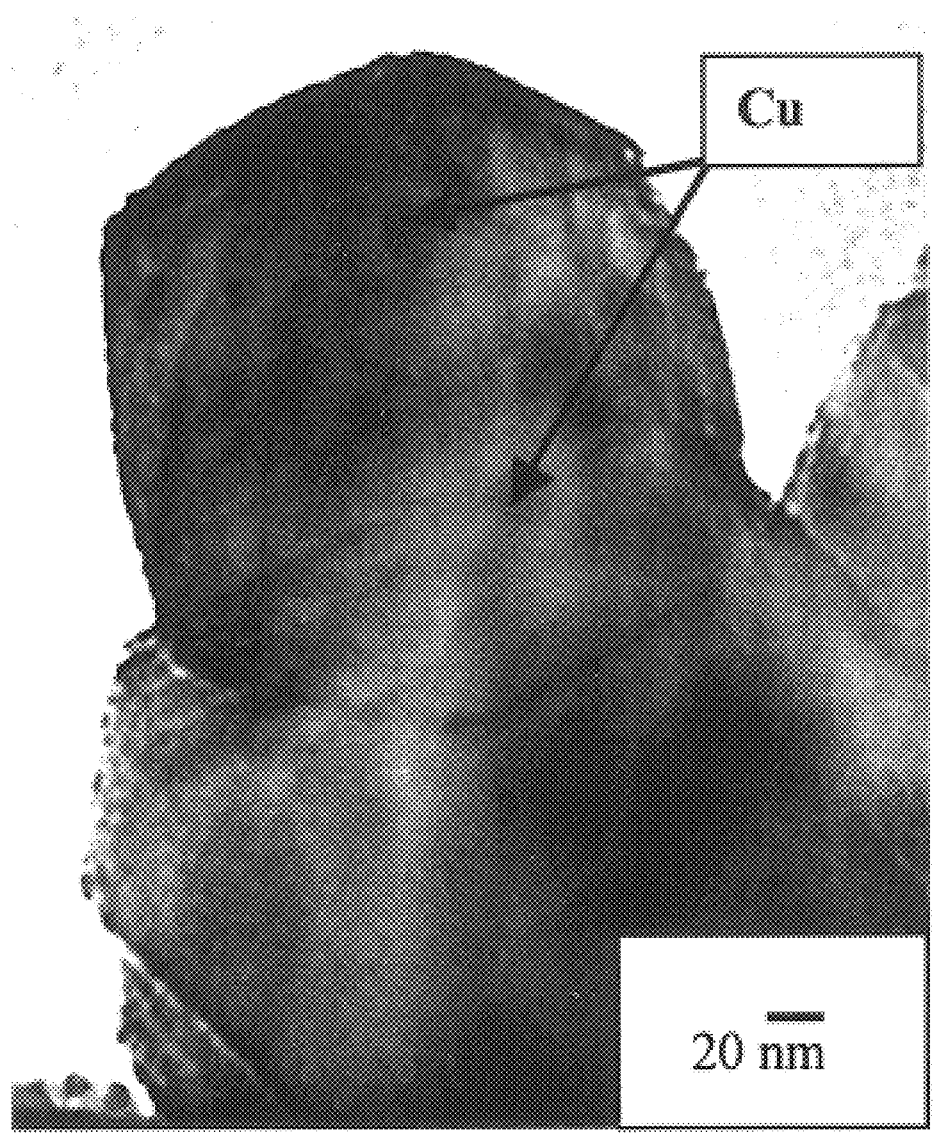
FIG. 19 is a TEM image of the material of FIG. 18, showing that fine copper metal precipitates have formed within the MnO matrix, thereby providing direct evidence of internal reduction.
Figure 20:
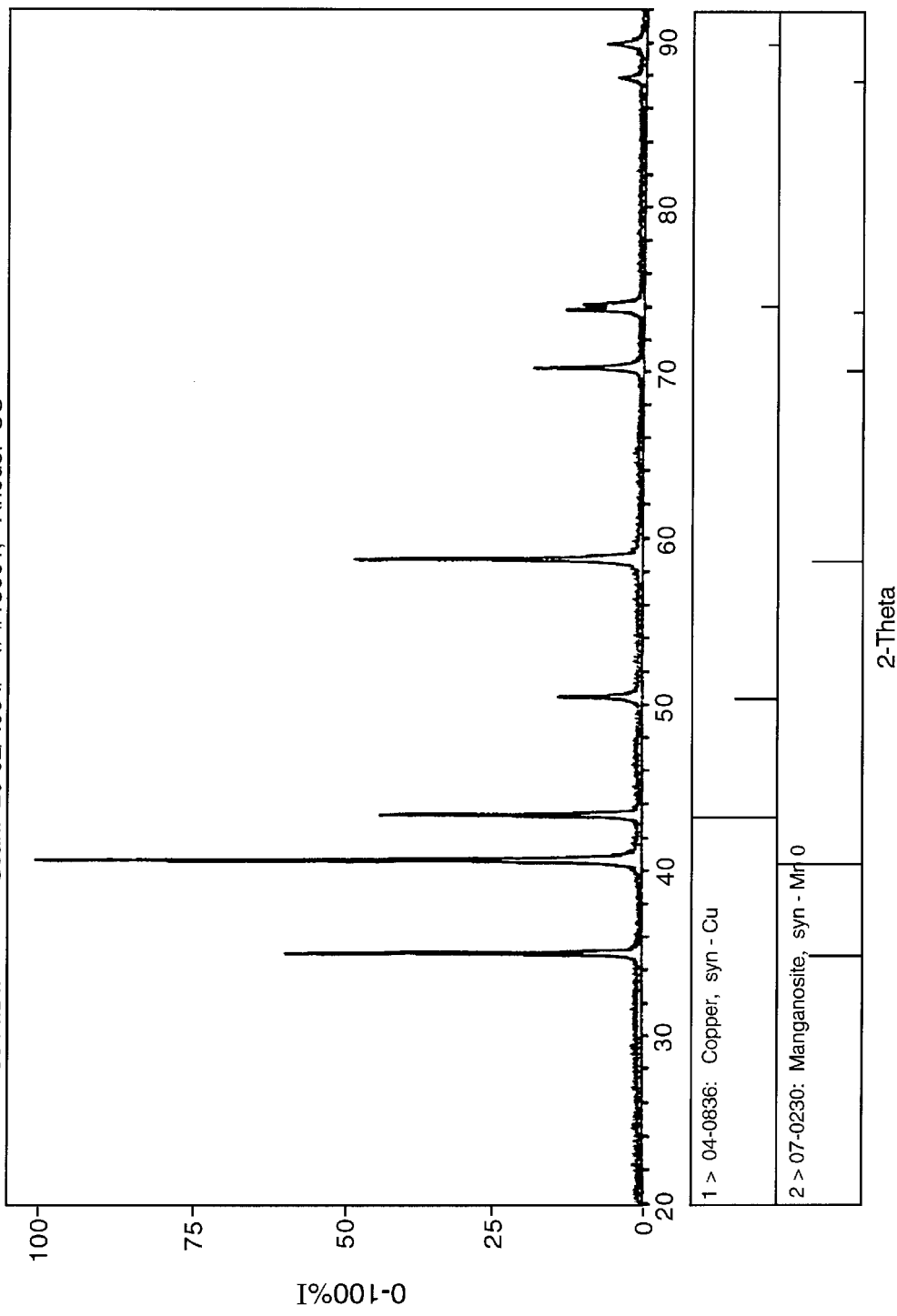
FIG. 20 is and XRD pattern of the material of FIG. 18 after a partial reduction heat treatment at 1070° C. for 4 h in a $CO/CO_2$ mixture yielding an oxygen partial pressure of approximately $10^{-9.5}$ atmospheres.
Figure 21:
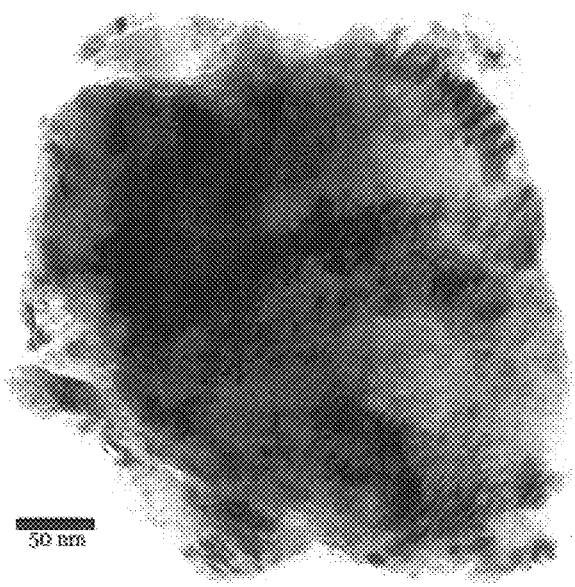
FIG. 21 is a TEM image of a single particle and corresponding selected-area diffraction pattern of the material of FIG. 21 (Sample 9), showing that the copper metal precipitates formed within the MnO matrix are finer than in the instance of FIG. 19, and also showing evidence for strain within the particle, thereby providing direct evidence of internal stresses after internal reduction.
Figure 21:
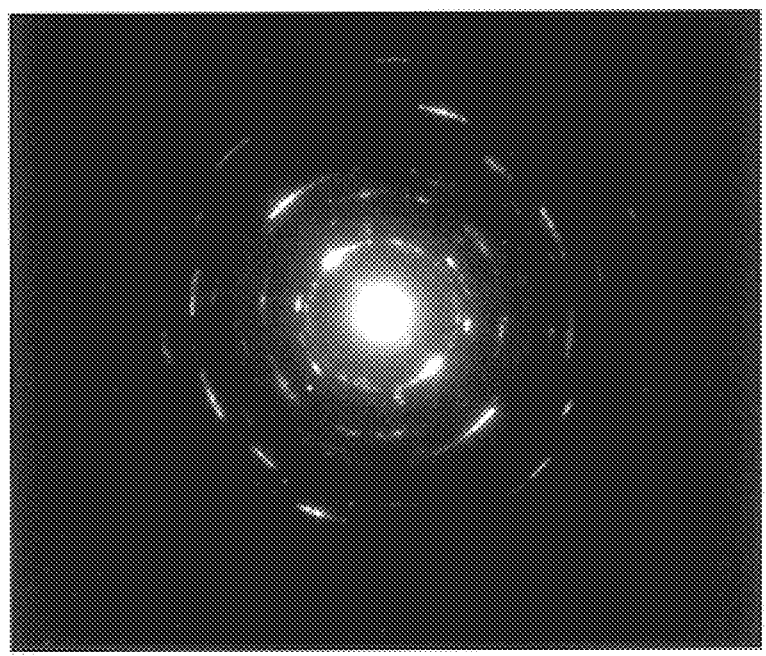

Portions of this oxide were then subjected to internal reduction. The eduction step was carried out in a $CO/CO_2$ mixture with a total pressure of about one atmosphere, and which at the firing temperature used, was computed to yield a gas phase equilibrium giving an oxygen partial pressure below that necessary to reduce copper oxide to copper metal, according to published thermodynamic data as represented by the Ellingham diagram. The firing temperatures used were below the copper melting point of 1084° C. In one example, the powder was put in an alumina boat and fired at 800° C. for 4 h in a $CO/CO_2$ gas mixture of ratio 1/10, yielding at equilibrium an oxygen partial pressure of about $10^{-16}$ atm. The resulting powder was brown in color. X-ray diffraction showed that this material consisted of Cu metal and MnO. Transmission electron microscopy, FIG. 19, combined with scanning transmission electron microscopy analysis of the particle and precipitate compositions showed that the internal precipitates, of approximately 20 nm average diameter, were copper metal. Thus it is shown that a copper manganese mixed oxide of the spinel structure may undergo internal reduction to form copper metal precipitates within a manganese oxide matrix. In another example, the powder was put in an alumina boat and fired at 1070° C. for 4 h in a $CO/CO_2$ gas mixture of ratio 1/66, yielding at equilibrium an oxygen partial pressure of about $10^{-9.5}$ atm. The resulting powder was dark green in color. X-ray diffraction of this sample, FIG. 20, showed that the resulting material was also a mixture of Cu metal and MnO. However, the microstructure was quite different, again showing internal reduction to form copper metal, but with the copper precipitates being finer and less distinct, as shown in FIG. 21. Notably, the internally-reduced mixture of Cu and MnO in FIG. 21 shows the presence of strain contours, with are well-known to those skilled in the art to be indicative of a deformation in the crystalline materials that is also associated with the presence of stress. Thus it is seen that internal reduction has produced a material with internal stresses and strains, as was intended by the thermochemical treatments, and which thereby comprise a material of the invention. The internally-stressed Cu+MnO material of FIGS. 20 and 21 is hereafter referred to as Sample 9.

Figure 22:
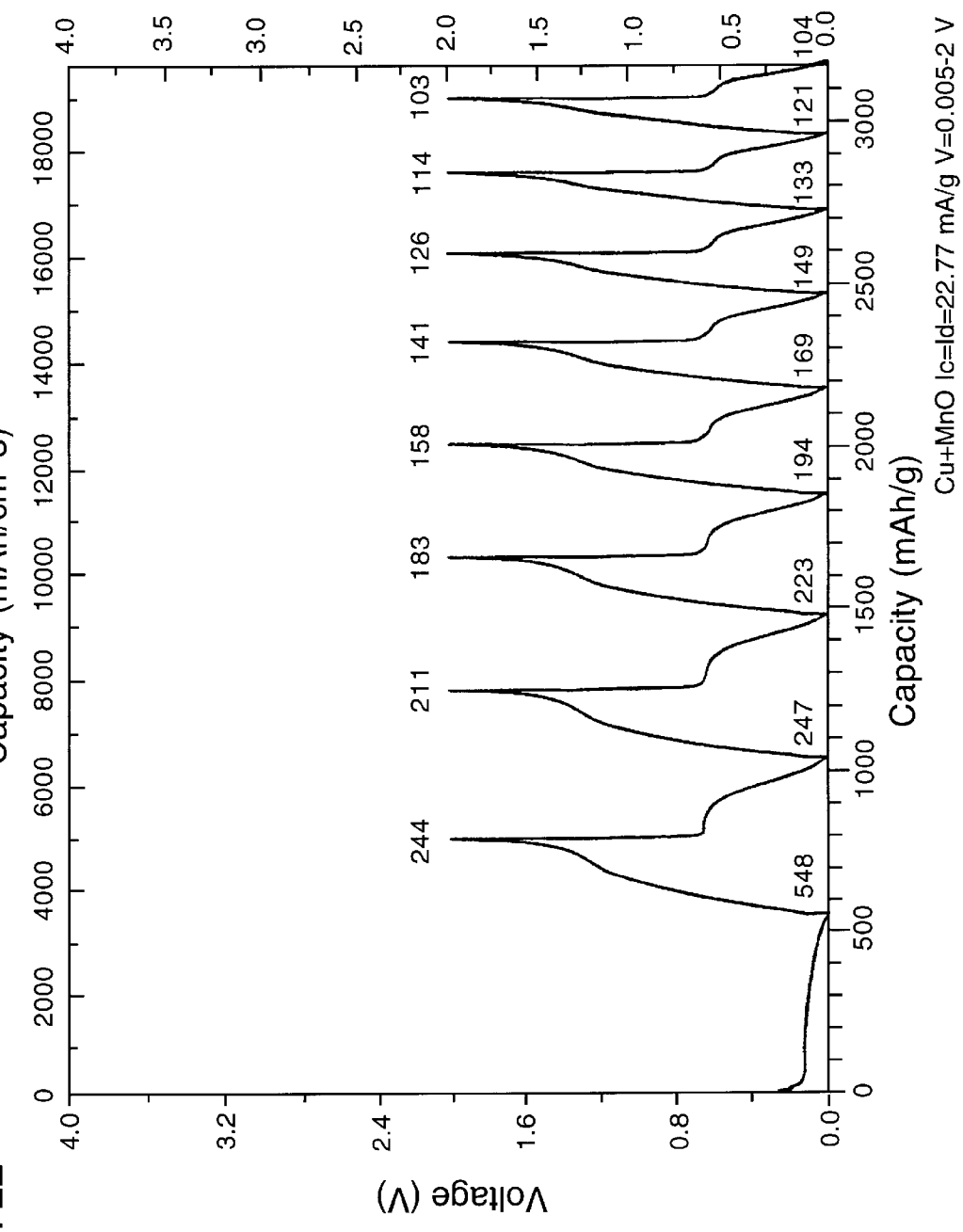
FIG. 22 illustrates the charge-discharge results for Sample 9, measured between 0.005 and 2V at a current rate of 22.8 mA per gram of metal-metal oxide material plus carbon (numbers in the figure indicate the charge capacity of each discharge or charge segment, in units of mAh/g)
Figure 23:
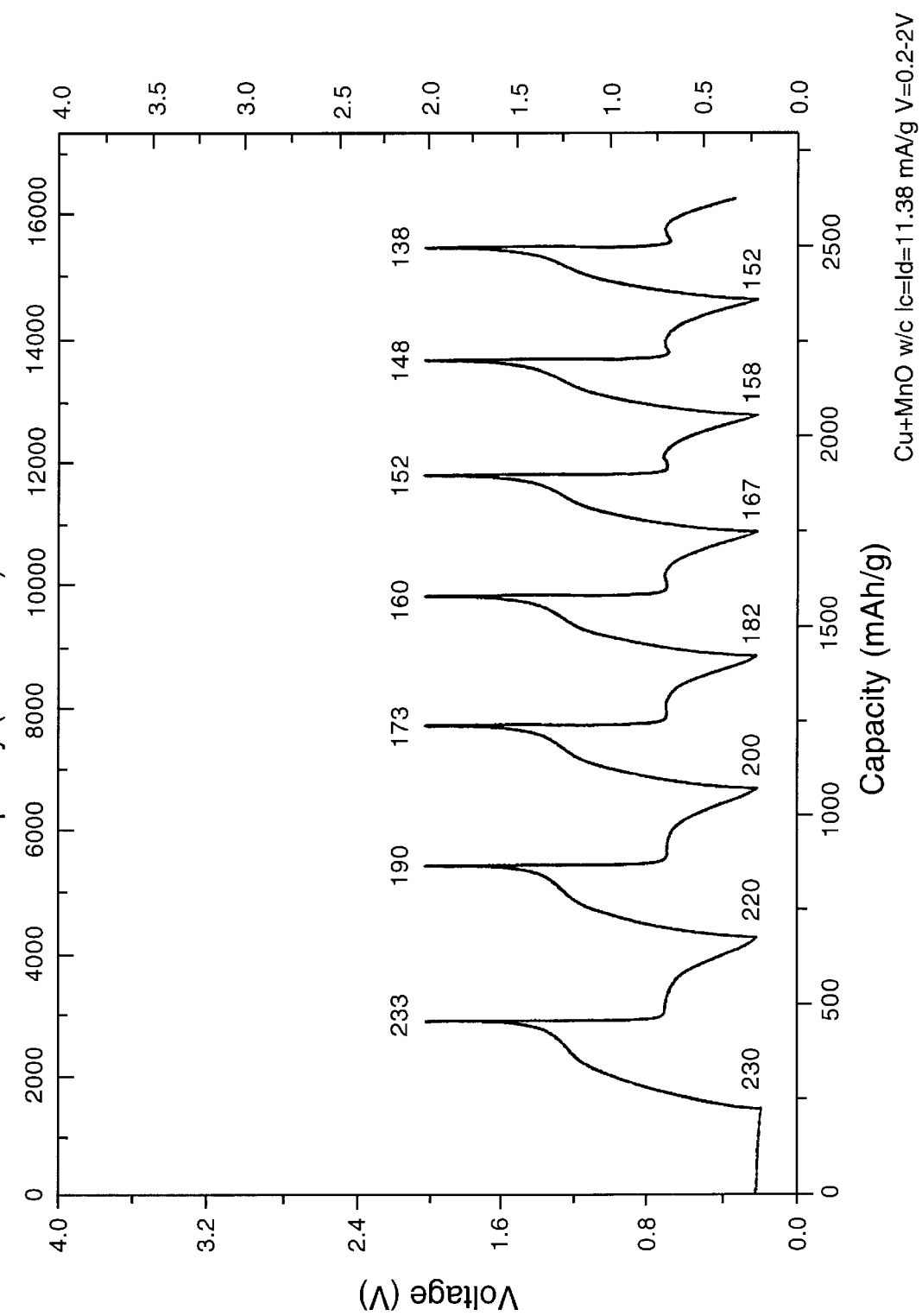
FIG. 23 illustrates charge-discharge results for Sample 9, measured between 0.2 and 2V at a current rate of 11.38 mA per gram of metal-metal oxide material plus carbon. During the first discharge, the discharge cycle was terminated at a capacity of 230 mA/g (numbers in the figure indicate the charge capacity of each discharge or charge segment, in units of mAh/g)

Composite pellet samples of Sample 9 were prepared, and electrochemical tests were conducted, following the procedure described in Example 2. FIG. 22 shows cycling results measured between 0.005–2V at a current rate of 22.8 mA per gram of metal-metal oxide composite plus carbon. A low plateau near 0.2V was observed in the $1^{st}$ discharge (Li insertion) with the $1^{st}$ discharge capacity being 540 mAh/g. The subsequent cycles exhibit a different voltage plateau near 1.25V during charging and 0.6V during discharging. The capacity of the $1^{st}$ charge is 244 mAh/g. Since the density of the Cu+MnO mixture is readily computed to be 6.187 g/cm$^3$, the volumetric capacity during $1^{st}$ charge is a high value of 1509 mAh/cm$^3$. Using the voltage range of 0.005–2V, the capacity fades noticeably over the first few cycles. FIG. 23 shows cycling measured on Sample 9 using a different procedure, in which the first discharge was terminated at a capacity of 230 mAh/g, and the test cell switched to charging. Thereafter, the cell was allowed to cycle between 0.2 and 2V. Throughout, the current rate was 11.38 mA per gram of metal-metal oxide composite plus carbon. Notice that the first cycle irreversibility is essentially zero. The first-charge capacity of 233 mAh/g corresponds to a high volumetric capacity of 1442 mAh/cm$^3$. Furthermore, the reversibility upon cycling is greatly improved, compared to the results for the same sample in FIG. 22, when the voltage range is limited in this manner.

Thus the results of this Example show firstly that a copper-metal oxide composite material may be produced by the partial reduction of a starting mixed oxide containing copper. The resulting material contains a fine dispersion of the copper metal within the oxide, and the whole may be in a state of internal stress. Such a material is shown to possess useful electroactive properties as an electrode for lithium batteries. Indeed, the reversible lithium storage capacity such a composite is much greater than that corresponding to a limiting composition of $Li_{0.25}Cu$ that is expected of bulk copper. This provides evidence for the alloying of lithium with copper to unexpectedly high concentrations due to the presence of internal stresses.

From this example it is understood that any spinel structure oxide containing more than two metals, one or more of which can be preferentially reduced to form a metal dispersion within or intimately mixed with the oxide that remains, and the remainder of which form an oxide matrix that is conductive to electrons and lithium ions, can exhibit similar improvements in electrochemical charge capacity and resistance to cycling fade over the bulk metal alone when used as an electrode. Other manganese spinel structure compounds in which the non-manganese metal is reduced during internal reduction and subsequently alloys with lithium during use as an electrode include, but are not limited to, $AgMn_2O_4$, $Ag_2MnO_4$, $Sb_2MnO_4$, $SnMn_2O_4$, $ZnMn_2O_4$, $Zn_2MnO_4$, and $In_2MnO_4$. Any solid solutions or physical mixtures of these spinels with each other or with a copper-manganese spinel also comprise materials of the invention. Other spinel structure compounds in which copper can be a preferentially reduced metal include, but are not limited to, $CuAl_2O_4$, $CuFe_2O_4$, $CuCr_2O_4$, and $CuCo_2O_4$. Any solid solutions or physical mixtures of these spinels with each other, with a copper-manganese spinel, or with one or more of the spinels previously listed also comprise materials of the invention.

EXAMPLE 4

Eutectic Solidification in $Sb_2O_3$—$V_2O_5$ Followed by Partial Reduction

It is well-known that eutectic solidification can result in finely-divided multiphase microstructures. Finely-divided metal anodes can be produced from such phase-separated mixtures using internal reduction. One example to which this approach is applied is the system $Sb_2O_3$—$V_2O_5$, which published data show has one intermediate compound, the $SbVO_4$ rutile compound referred to in Example 2. It has two eutectics, the first being between $Sb_2O_3$ and $SbVO_4$ being at 630° C, and the second between $SbVO_4$ and $V_2O_5$ being at 650° C. By rapidly cooling eutectic compositions from the single phase liquid field, a eutectic solidification microstructure is obtained. By rapidly quenching the liquid to room temperature, a glassy oxide can also be obtained. In either instance, the materials of this invention are obtained by subjecting the oxide to a partial reduction treatment at a temperature and oxygen partial pressure where Sb, the metal having the less negative Gibbs free energy of reduction, is reduced to Sb metal or at least an Sb-rich metal alloy, while the vanadium component remains predominantly as the oxide, and provides an electronically and lithium-ionically conductive host or matrix material contacting the Sb-rich metal dispersion. Partial reduction of the oxide mixture is conducted at 600° C. in a gas atmosphere with a total pressure of about one atmosphere in which the oxygen partial pressure is less than about $10^{-19}$ atm, but above about $10^{-40}$ atm.

EXAMPLE 5

Partial Reduction of a Silver-Manganese Spinel

A composition $AgMn_2O_4$ was prepared by mixing powders of AgO and MnO and firing in air at 500° C. for 24 hours. After firing the mixture was ground and fired again in air at 500° C. for 24 hours. The resulting powders was analyzed by X-ray diffraction and found to contain the spinel $AgMn_2O_4$, as well as Ag metal and another Ag—Mn—O phase. Thus it was observed that partial reduction of the silver oxide to silver metal had occurred during the firing process. Internal reduction of any of the Ag—Mn—O phases to form Ag-rich metal precipitates within a manganese oxide matrix is accomplished by firing in one of the following gas atmospheres and temperature ranges for a time long enough that X-ray diffraction shows that the silver metal fraction has increased. In each instance, the thermochemical treatment is sufficient to reduce the silver oxide component of the mixed oxides to silver metal while not reducing the manganese oxides to manganese metal.

a) $CO/CO_2$ ratio of $1/10^4$ at one atmosphere total pressure, at a temperature of 800–900° C. This firing condition yields an oxygen partial pressure of $10^{-10}$ to $10^{-8}$ atm.

b) $CO/CO_2$ ratio of $1/10^5$ at one atmosphere total pressure, at a temperature of 400–900° C. This firing condition yields an oxygen partial pressure of $10^{-24}$ to $10^{-7}$ atm.

c) $CO/CO_2$ ratio of $1/10^6$ at one atmosphere total pressure, at a temperature of 800–900° C. This firing condition yields an oxygen partial pressure of $10^{-38}$ to $10^{-4}$ atm.

The resulting material is prepared:as an electrode as described in Example 1 and is used in a lithium battery anode.

EXAMPLE 6

Internal Reduction of an Oxide-Silver Composite

This is an example of the embodiment whereby a reducible oxide is dispersed within a second material that is a metal, and then a thermochemical treatment is conducted to reduce said oxide and decrease its molar volume. Upon doing so, said oxide decreases its volume and is then able to alloy with a high concentration of lithium.

A suitable second material is silver because it has a less negative Gibbs free energy of oxidation than many metals whose oxides can be used as the first material in this embodiment. Silver oxide $Ag_2O$ decomposes to silver metal at a temperature of about 230° C. Silver metal melts at a temperature of about 962° C. Furthermore, oxygen is known to diffuse rapidly through solid silver at moderately high temperatures, thereby facilitating the internal reduction of the reducible oxide. Used with silver as the second material, suitable reducible oxides include $B_2O_3$, $Cu_2O$, $CuO$, $Sb_2O_3$, $Sb_2O_5$, or $ZnO$. These oxides are suitable because their metals can intercalate a high concentration of lithium, and the oxides can be reduced to their metals at a temperature below that at which a liquid forms between the metal obtained and silver.

The reducible oxide is prepared as a fine powder, and is then mixed with or dispersed in silver metal by one of the following processes:

Silver metal is deposited on fine powder particles of the reducible oxide by electroplating or electroless plating.

The oxide and silver are simultaneously or sequentially sputtered to form a film on a substrate. The film may be subsequently heated at a temperature and oxygen partial pressure that does not reduce the oxide, for the purposes of aggregating and coarsening the oxide phase, prior to the internal reduction heat treatment. Such a material can bemused as the electrode for a thin-film battery.

The reducible oxide is mixed with silver metal powder and ball-milled to form a fine particle composite. The composite powder may be heated in a gas atmosphere that does not cause reduction of the reducible oxide in order to anneal and densify the oxide-silver composite.

The reducible oxide is mixed with silver metal powder and the composite is compacted by pressing, rolling, or extrusion, into the form of a thin wire, pellet, or sheet.

Where the reducible oxide has a melting temperature greater than that of silver metal, the oxide can be dispersed in liquid silver by mixing and the whole is subsequently compacted.

The reducible oxide is first mixed or milled with silver oxide, and then the silver oxide is heated in an atmosphere causing it to be reduced to silver metal, but not causing the reducible oxide to be reduced. The mixture is then heated without causing reduction of the reducible oxide, in order to densify or relieve stresses in the silver metal, resulting in a dispersion of the oxide in silver metal that is substantially free of internal stresses.

The thermochemical reduction treatment given the oxide-silver composite in order to reduce the oxide partially or completely to its metal is next conducted. The conditions of this treatment are determined by the following selection criteria:

The heat treatment is conducted at a temperature less than the melting point of silver, that is, less than about 960° C. and preferably less than about 900° C., so that the silver metal remains as a rigid solid.

The heat treatment is conducted in a reducing gas atmosphere which according to the Ellingham diagram provides an oxygen partial pressure in which the reducible oxide is unstable with respect to its metal.

The heat treatment is conducted at a temperature below that at which a liquid forms between silver and the metal produced by reduction of the oxide dispersion (that is, below the solidus temperature of the metal system which results upon reduction). For example, in the case of copper, reduction is conducted below the eutectic temperature of 780° C. in the Ag—Cu binary system. In the case of antimony, reduction is conducted below the eutectic temperature at 485° C., and in the case of zinc, reduction is conducted below the zinc melting point of 420° C.

Upon reduction of the oxide, oxygen diffuses through the silver metal to the ambient, and the oxide particle shrinks in volume as it is partly or completely reduced to the metal. The material thus obtained is used as a lithium-active negative electrode. Where the oxide-silver mixture has been shaped into a thin sheet or deposited as a film, the sheet can be directly used as an electrode without mixing with binders or other additives. Upon alloying with lithium, both the reduced metal or metal oxide and the silver can alloy with lithium. However, due to the creation of internal stresses the composite mixture is able to reversibly alloy with a higher concentration of lithium than a similar composite mixture prepared without the use of partial reduction.

EXAMPLE 7

Mechanically Milled and Partially Reduced Mixed Metal Oxide

This is an example of a mixed metal oxide starting composition in which the metal oxides are segregated by use of individual metal oxide powders.

A mixture of $SnO_2$ and $TiO_2$ in a 1:1 molar ratio, to which sufficient $Ta_2O_5$ is added to obtain 1 cation mole % doping as in the case of Sample 8, is prepared by roller mixing in a polypropylene jar with Teflon® milling balls. For each batch of partially reduced sample, three grams of the mixed material are fired to 500° C. in air in an alumina crucible in order to burn off any residual organic matter. The powder is then subjected to high energy ball milling, using a Spex mill and a zirconia milling jar with zirconia milling ball. The sample is milled for a total of between 15 and 30 minutes, and then the $SnO_2$ component is reduced to Sn metal by firing in a tube furnace under flowing hydrogen at temperatures between 300–700° C. for times between 2 h and 48 h. The resulting material is a mixture of ultrafine Sn metal particles and $TiO_2$ powder, and is used as the lithium-active material in a composite electrode.

EXAMPLE 8

Partial Oxidation of a Mixed Metal Alloy

This is an example of the embodiment whereby one component of a mixed metal alloy is oxidized, thereby expanding and placing the remaining metal dispersion in substantially tensile stress, and thereby increasing the amount of lithium that the electrode can be reversibly alloyed with.

The first metal is selected to have a less negative Gibbs free energy of oxidation than the second, and to also be able to alloy with lithium to a high concentration. Ag, B, Bi, Cd, Cu, Pb, Sb, Sn, or Zn are amongst such metals. The choice of the first metal is however also dictated by the second metal, which is selected so that it has a more negative Gibbs free energy of oxidation. It is preferable that this metal when oxidized has substantial electronic and lithium-ionic conductivity. However, even those metals whose oxide when in a pure and highly oxidized form are not conductive may be used, if the partial oxidation is limited so as to produce a second oxide is nonstoichiometric or doped with the first metal so as to be conductive. Examples of suitable binary alloys include but are not limited to:

$Ag_aCu_{1-a}$, $Ag_aMn_{1-a}$, $Ag_aSb_{1-a}$, $Ag_aSn_{1-a}$, $Ag_aNi_{1-a}$, $Ag_aCo_{1-a}$, $Ag_aFe_{1-a}$, $Ag_aZn_{1-a}$, $Ag_aCr_{1-a}$, $Ag_aV_{1-a}$, $Ag_aB_{1-a}$, $Ag_aSi_{1-a}$, $Ag_aTi_{1-a}$, $Ag_aCe_{1-a}$, $Ag_aAl_{1-a}$, $Ag_aMg_{1-a}$; or $Cu_aMn_{1-a}$, $Cu_aSb_{1-a}$, $Cu_aSn_{1-a}$, $Cu_aNi_{1-a}$, $Cu_aCo_{1-a}$, $Cu_aFe_{1-a}$, $Cu_aZn_{1-a}$, $Cu_aCr_{1-a}$, $Cu_aV_{1-a}$, $Cu_aB_{1-a}$, $Cu_aSi_{1-a}$, $Cu_aTi_{1-a}$, $Cu_aCe_{1-a}$, $Cu_aAl_{1-a}$, $Cu_aMg_{1-a}$; or $Sb_aSn_{1-a}$, $Sb_aNi_{1-a}$, $Sb_aCo_{1-a}$, $Sb_aFe_{1-a}$, $Sb_aZn_{1-a}$, $Sb_aCr_{1-a}$, $Sb_aV_{1-a}$, $Sb_aB_{1-a}$, $Sb_aSi_{1-a}$, $Sb_aTi_{1-a}$, $Sb_aCe_{1-a}$, $Sb_aAl_{1-a}$, $Sb_aMg_{1-a}$; or $Sn_aNi_{1-a}$, $Sn_aCo_{1-a}$, $Sn_aFe_{1-a}$, $Sn_aZn_{1-a}$, $Sn_aCr_{1-a}$, $SnV_{1-a}$, $Sn_aB_{1-a}$, $Sn_aSi_{1-a}$, $Sn_aTi_{1-a}$, $Sn_aAl_{1-a}$, $Sn_aMg_{1-a}$ or $Zn_aCr_{1-a}$, $Zn_aV_{1-a}$, $Zn_aB_{1-a}$, $Zn_aSi_{1-a}$, $Zn_aTi_{1-a}$, $Zn_aCe_{1-a}$, $Zn_aAl_{1-a}$, $Zn_aMg_{1-a}$; or $B_aSi_{1-a}$, $B_aTi_{1-a}$, $B_aCe_{1-a}$, $B_aAl_{1-a}$, $B_aMg_{1-a}$; or $Si_aTi_{1-a}$, $Si_aCe_{1-a}$, $Si_aAl_{1-a}$, $Si_aMg_{1-a}$, where in each instance the metal appearing first is that of less negative Gibbs free energy of oxidation, and $0.1<a<0.9$. From this example, ternary and multinary alloys satisfying the requirements described above will be obvious to those skilled in the art.

The alloy between metals of the first type and metals of the second type can be prepared as a single metallic or intermetallic phase or multiple phases according to one of numerous methods of alloy and compound preparation well known to those skilled in the art, including melting, solid state reaction, mechanical alloying, rapid solidification, and physical or chemical vapor deposition.

Prior to partial oxidation, it is desirable to prepare the alloy or compound in a form with a thinnest dimension that is small enough to allow complete oxidation. It is therefore preferable that the alloy is prepared as a powder, sheet, wire, or thin film with a smallest dimension that is less than 1 millimeter and more preferably less than 100 micrometers. The alloy. or compound is then partially oxidized by heating to a temperature and in an atmosphere selected so that the first metal is stable as a metal and the second metal is stable as an oxide. Thermodynamic tables and Ellingham diagrams are used to select these conditions.

For an alloy $Cu_aZn_{1-a}$, partial oxidation at 800° C. in a gas atmosphere giving an oxygen partial pressure between about $10^{-24}$ atm and about $10^{-9}$ atm produces a material consisting of Cu-rich metal precipitates dispersed in a Zn-rich oxide.

For an alloy $Cu_aTi_{1-a}$, partial oxidation at 1000° C. in a gas atmosphere giving an oxygen partial pressure between about $10^{-29}$ atm and about $10^{-5}$ atm produces a material consisting of Cu-rich metal precipitates dispersed in a rutile $TiO_2$ oxide.

For an alloy $Sb_aZn_{1-a}$, partial oxidation at 600° C. in a gas atmosphere giving an oxygen partial pressure between about $10^{-30}$ atm and about $10^{-19}$ atm produces a material consisting of Sb-rich metal precipitates dispersed in a Zn-rich oxide.

Each of these materials is then prepared as an electrode as described in Example 1 and is used in a lithium battery anode.

What is claimed is:

1. A composite material for use as an energy-storage material comprising, a first material comprising one or more metals, metal alloys or metal compounds containing $Me^I$ capable of alloying with a species selected from the group consisting of alkali metals and hydrogen, the first material intimately mixed with a matrix of a second material comprising a metal compound $Me^{II}X$, produced by partial reduction of a mixed-metal composition $Me^I_aMe^{II}_{1-a}X_z$, where $0.1<a<0.9$, $z>0$, and X is one of oxygen, boron, carbon, nitrogen, phosphorus, fluorine, chlorine, bromine, or iodine, under conditions that preferentially reduce $Me^I$ over $Me^{II}$.

2. A composite material for use as an energy-storage material comprising, a first material comprising one or more metals, metal alloys or metal compounds containing $Me^I$ capable of alloying with a species selected from the group consisting of alkali metals and hydrogen, the first material intimately mixed with a matrix of a second material comprising a metal compound $Me^{II}X$, produced by partial oxidation of a mixed-metal composition $Me^I_aMe^{II}_{1-a}X_z$, where $0.1<a<0.9$, $z>0$, and X is one of oxygen, boron, carbon, nitrogen, phosphorus, fluorine, chlorine, bromine, or iodine, or a starting mixed-metal alloy $Me^I_aMe^{II}_{1-a}$, where $0.1<a<0.9$ under conditions that preferentially oxidize $Me^{II}$ over $Me^I$.

3. The composite material of claim 1 or 2, wherein the mixed-metal composition is a solid solution.

4. The composite material of claim 1 or 2, wherein the mixed-metal composition is a phase-separated composition, which is phase-separated into a first phase comprising compounds rich in $Me^I$ and a second phase comprising compounds rich in $Me^{II}$.

5. The material of claim 1 or 2, wherein the mixed-metal composition is a mixture of particles of different composition.

6. The composite material of claim 1 or 2, wherein the second material comprises a compound $Me^{II}_cX_d$ where $0.5<c/d<3$.

7. The material of claims 1 or 2, wherein $Me^I$ as part of the first material has a lower molar volume than $Me^I$ as part of the mixed-metal composition.

8. The material of claim 1, wherein both the first material and the second material have a reduced molar volume compared to the mixed-metal composition, and the first material undergoes a greater molar volume decrease than does the second material during partial reduction.

9. The material of claim 2, wherein both the first material and the second material have an increased molar volume compared to the mixed-metal composition, and the second material undergoes a greater molar volume increase than does the first material during partial oxidation.

10. The material of claim 1 or 2, wherein X is oxygen and $Me^{II}$ comprises one or more metals selected from the group consisting of Ti, V, Cr, Mn, Fe, Co, Ni, Cu, Nb, Mo, Ru and Ce.

11. The material of claim 10, wherein $Me^{II}$ comprises one or more metals in an amount in the range of about 10–90 mole % of the mixed-metal composition.

12. The material of claim 11, wherein $Me^{II}$ comprises one or more metals in an amount greater than about 50 mole % of the mixed-metal composition.

13. The material of claim 10, wherein $Me^{II}$ comprises one or more metals in an amount greater than about 75 mole % of the mixed-metal composition.

14. The material of claim 1, wherein X is oxygen and the mixed-metal composition $Me^{I}_{a}Me^{II}_{1-a}X_z$ has a crystalline structure selected from the group consisting of the spinel structure, the rocksalt structure, the rutile structure, the corundum structure, the ilmenite structure, the perovskite structure and ordered or disordered derivatives of these structures.

15. The material of either of claims 1 or 2, wherein X is oxygen and the second material comprises a normal spinel, inverse spinel, or disordered spinel structure compound $Me^{II}_{c}X_d$ where $0.5<c/d<1$.

16. The material of claim 14, wherein the second material remaining after partial reduction is a compound $Me^{II}_{x}O_y$, where $0.5<x/y<1$, having a crystalline structure selected from the group consisting of rutile, corundum, ilmenite, perovskite and ordered or disordered derivatives of these structures.

17. The material of claim 1 or 2, wherein X is oxygen and $Me^{I}$ is selected from the group consisting of Ag, Sb, Sn, Cu, In, Ge, Zn, Ga, B, and Si.

18. The material of claim 1 or 2, wherein X is oxygen and $Me^{I}$ is selected from the group consisting of Ag, Sb, Zn and Sn.

19. The material of claim 17, wherein $Me^{II}$ is selected from the group consisting of Cu, Mn, Sb, Ni, Co, Fe, In, Ge, Zn, Ga, Cr, V, B, Si, Ti, Ta, Nb, Ru, Ce, Al and Mg, and wherein $Me^{II}$ is further selected to have a more negative Gibbs free energy of metal oxide formation than $Me^{I}$.

20. The material of claim 1 or 2, wherein the mixed metal composition comprises $Me^{I}_{a}Mn_{1-a}O_{4/3-y}$ spinel, x being between about 0.17 and 0.67 and y being between zero and about 0.17, and the metal $Me^{I}$, selected from the group consisting of Ag, Sb, Zn, and Sn.

21. The material of claim 1 or 2, wherein the mixed-metal composition has formula $Me^{I}_{a}Me^{II}_{1-a}X_z$, X is oxygen, $Me^{I}$ is Ag, $Me^{II}$ is Mn, and $0.1<a<0.9$, and $1.9<z<2.1$.

22. The material of claim 1 or 2, wherein the mixed metal composition has formula $Me^{I}_{a}Me^{II}_{1-a}X_z$, X is oxygen, $Me^{I}$ is Sb, $Me^{II}$ is Mn, and $0.1<a<0.9$, and $1.9<z<2.1$.

23. The material of claim 1 or 2, wherein the mixed metal composition has formula $Me^{I}_{a}Me^{II}_{1-a}X_z$, X is oxygen, $Me^{I}$ is Zn, $Me^{II}$ is Mn, and $0.1<a<0.9$, and $1.9<z<2.1$.

24. The material of claim 1 or 2, wherein the mixed-metal composition has the formula $Me^{I}_{a}Me^{II}_{1-a}O_z$, where $Me^{I}$ is Sb; $Me^{II}$ is V, and $0.1<a<0.9$, and $1.9<z<2.3$.

25. The material of claim 1 or 2, where in the mixed-metal composition has the formula $Me^{I}_{b}Me^{II}_{1-b}O_e$, where $Me^{I}$ is Sn, $Me^{II}$ is Ti, and $0.2<b<0.8$, and $1.8<e<2.2$.

26. An electroactive composite material, comprising:
a first electroactive material, said electroactive material comprising $Me^{I}$ capable of alloying with a species selected from the group consisting of alkali metals and hydrogen; and
a second material having the first active material intimately mixed therein, said second material comprising $Me^{II}_{c}X_d$, where $0.5<c/d<3$ and X is one of oxygen, boron, carbon, nitrogen, phosphorus, fluorine, chlorine, bromine, or iodine,
wherein the first material is in a state of tensile stress or the composite has void space in its interior.

27. An electroactive composite material, comprising:
a first electroactive metal, said electroactive material comprising a phase enriched in a metal or metal alloy, $Me^{I}$, capable of alloying with a species selected from the group consisting of alkali metals and hydrogen; and
a second material having the first active material intimately mixed therein, said second material comprising a metal oxide, $Me^{II}_{y}O_z$, where $0.5<y/z<3$, wherein $Me^{I}$ has a less negative Gibbs free energy for alloying or compound formation with oxygen than the metals that comprise $Me^{II}O$.

28. The composite material of claim 1, 2, 26 or 27, wherein the alloying species is lithium.

29. The composite material of claim 26, wherein the second material comprises a compound $Me^{II}_{c}X_d$ where $0.5<c/d<3$.

30. The composite material of claims 26 or 27, wherein $Me^{I}$ as part of the first material has a lower molar volume than $Me^{I}$ as part of the mixed-metal composition.

31. The composite material of claim 26, wherein $Me^{I}$ has a less negative Gibbs free energy for alloying or compound formation with oxygen than the metals that comprise $Me^{II}O$.

32. The material of claims 26 or 27, wherein $Me^{II}$ comprises one or more metals selected from the group consisting of Ti, V, Cr, Mn, Fe, Co, Ni, Cu, Nb, Mo, Ru and Ce.

33. The material of claim 32, wherein $Me^{II}$ comprises one or more metals in an amount in the range of about 10–90 mole % of the electroactive composite material.

34. The material of claim 32, wherein $Me^{II}$ comprises one or more metals in an amount greater than about 50 mole % of the electroactive composite material.

35. The material of claim 32, wherein $Me^{II}$ comprises one or more metals in an amount greater than about 75 mole % of the electroactive composite material.

36. The material of claim 27, wherein the second material is a normal spinel, inverse spinel, or disordered spinel structure compound $Me^{II}_{x}O_y$ where $0.5<x/y<1$.

37. The material of claim 27, wherein the second material is a compound $Me^{II}_{x}O_y$, where $0.5<x/y<1$, having a crystalline structure selected from the group consisting of rutile, corundum, ilmenite, perovskite and ordered or disordered derivatives of these structures.

38. The material of claim 27, wherein $Me^{I}$ is selected from the group consisting of Ag, Sb, Sn, Cu, In, Ge, Zn, Ga, B, and Si.

39. The material of claim 27, wherein $Me^{I}$ is selected from the group consisting of Ag, Sb and Sn.

40. The material of claim 26 or 27, wherein $Me^{II}$ is selected from the group consisting of Cu, Mn, Sb, Ni, Co, Fe, In, Ge, Zn, Ga, Cr, V, B, Si, Ti, Ta, Nb, Ru, Ce, Al and Mg, and wherein $Me^{II}$, is further selected to have a more negative Gibbs free energy of metal oxide formation than $Me^{I}$.

41. The material of claim 1, 2, 26 or 27, wherein the first material is present in a dispersed form intimately mixed with or contained within the second material, the first material forming a plurality of particles, rods, nets, sheets, or a combination of such morphologies.

42. The material of claim 41, in which the first material has an average smallest dimension of less than 10 micrometers and greater than 5 micrometers.

43. The material of claim 41, in which the first material has an average smallest dimension of less than 5 micrometers and greater than 1 micrometers.

44. The material of claim 41, in which the first material has an average smallest dimension of less than 1 micrometer and greater than 0.1 micrometer.

45. The material of claim 41, in which the first material has an average smallest dimension of less than 0.1 micrometer.

46. The material of claim 1, 2, 26 or 27, wherein the second material is substantially conductive to electrons, electron holes or lithium ions.

47. The material of claim 1 or 2, wherein the mixed metal oxide composition is mechanically worked prior to partial oxidation or reduction.

48. An electrode for a lithium battery, comprising:
   a first electroactive material comprising a phase enriched in a metal or metal alloy, $Me^I$, capable of alloying with lithium; and
   a second material having the first electroactive material intimately mixed therein, said second material comprising a metal oxide, $Me_y^{II}O_z$, where $0.5 < y/z < 3$,
   wherein $Me^I$ has a less negative Gibbs free energy for alloying or compound formation with oxygen than the metals that comprise $Me^{II}O$.

49. The electrode of claim 48, further comprising an organic binder.

50. The electrode of claim 48, further comprising a conductive carbon powder.

51. A lithium battery, comprising;
   a cathode;
   an anode comprised of a first electroactive material comprising a phase enriched in a metal or metal alloy, $Me^I$, capable of alloying with a species selected from the group consisting of alkali metals and hydrogen; and a second material having the first electroactive material intimately mixed therein, said second material comprising a metal oxide, $Me_y^{II}O_z$, where $0.5 < y/z < 3$, wherein $Me^I$ has a less negative Gibbs free energy for alloying or compound formation with oxygen than the metals that comprise $Me^{II}O$; and
   an electrolyte in ionic and electrical contact with the anode and cathode.

52. A thin-film battery using the electrode of claim 48.

* * * * *